United States Patent
Kinstner et al.

(10) Patent No.: US 10,699,490 B2
(45) Date of Patent: *Jun. 30, 2020

(54) SYSTEM AND METHOD FOR MANAGING INTERACTIVE VIRTUAL FRAMES FOR VIRTUAL OBJECTS IN A VIRTUAL ENVIRONMENT

(71) Applicant: META VIEW, INC., San Mateo, CA (US)

(72) Inventors: Zachary R. Kinstner, Ada, MI (US); Rebecca B. Frank, Los Angeles, CA (US); Yishai Gribetz, Belmont, CA (US)

(73) Assignee: Meta View, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/253,570

(22) Filed: Jan. 22, 2019

(65) Prior Publication Data
US 2019/0325655 A1    Oct. 24, 2019

Related U.S. Application Data

(63) Continuation of application No. 15/154,910, filed on May 13, 2016, now Pat. No. 10,186,088.

(51) Int. Cl.
| | |
|---|---|
| *G06T 19/00* | (2011.01) |
| *G06F 1/16* | (2006.01) |
| *G06F 3/01* | (2006.01) |
| *G06F 3/0484* | (2013.01) |
| *G06T 17/10* | (2006.01) |

(52) U.S. Cl.
CPC ............ *G06T 19/006* (2013.01); *G06F 1/163* (2013.01); *G06F 3/011* (2013.01); *G06F 3/014* (2013.01); *G06F 3/017* (2013.01); *G06F 3/04845* (2013.01); *G06T 17/10* (2013.01); *G06T 19/00* (2013.01)

(58) Field of Classification Search
CPC ................................................... G06T 19/006
USPC ....................................................... 345/633
See application file for complete search history.

(56) References Cited

U.S. PATENT DOCUMENTS

| | | | | |
|---|---|---|---|---|
| 2011/0107270 | A1* | 5/2011 | Wang | G06F 19/3481 715/850 |
| 2016/0026253 | A1* | 1/2016 | Bradski | G02B 27/0172 345/8 |
| 2016/0171780 | A1* | 6/2016 | Vardi | G06T 19/006 345/419 |

* cited by examiner

*Primary Examiner* — Javid A Amini

(57) ABSTRACT

The methods, systems, techniques, and components described herein allow interactions with virtual objects in a virtual environment, such as a Virtual Reality (VR) environment or Augmented Reality (AR) environment, to be modeled accurately. More particularly, the methods, systems, techniques, and components described herein allow interactive virtual frames to be created for virtual objects in a virtual environment. The virtual frames may be built using line primitives that form frame boundaries based on shape boundaries of virtual objects enclosed by the virtual frame. An area of interactivity defined by the virtual frame may allow users to interact with the virtual object in the virtual environment.

20 Claims, 33 Drawing Sheets

SYSTEM AND METHOD FOR MANAGING INTERACTIVE VIRTUAL FRAMES FOR VIRTUAL OBJECTS IN A VIRTUAL ENVIRONMENT

FIELD

The disclosure relates to managing interactive virtual frames for virtual objects in a virtual environment, such as a Virtual Reality (VR) environment or an Augmented Reality (AR) environment.

BACKGROUND

When representing virtual objects in a virtual environment, such as a VR environment or an AR and/or mixed reality environment, it is often difficult to model interactions with the virtual objects. As examples, a user may wish to translate, rotate, stretch, compress, deform, etc. a virtual object in a virtual environment. It may be desirable for virtual environments to be equipped with technologies that accurately model the user's actions against the virtual object, or else the virtual environment may not be realistic or credible. However, it is often difficult to model virtual object(s) in a virtual environment so that user interactions with the virtual object appear natural and/or fluid to the user. This problem persists in VR environments where the virtual object does not correspond to a physical object as well as AR environments where the virtual object may correspond or be related to a physical object.

SUMMARY

The methods, systems, techniques, and components described herein allow interactions with virtual objects in a virtual environment, such as a Virtual Reality (VR) environment or Augmented Reality (AR) environment, to be modeled accurately and in a fashion that appears natural to the user. More particularly, the methods, systems, techniques, and components described herein allow interactive virtual frames to be created for virtual objects in a virtual environment. For example, individual virtual frames may be built using line primitives that form frame boundaries based on shape boundaries of virtual objects enclosed by the virtual frame. An area of interactivity defined by the virtual frame may allow users to interact naturally with the virtual object in the virtual environment. For example, a virtual panel may be surrounded by four line primitives to form an interactive virtual "frame".

In various implementations, methods, systems, techniques, and/or components for facilitating interaction with a virtual object in a virtual environment are provided. A virtual object having spatial dimensions in the virtual environment may be identified. In some implementations, a shape boundary of the virtual shape that corresponds to the spatial dimensions of the virtual object may be identified. One or more primitive virtual elements to be associated with the shape boundary may be gathered. The one or more primitive virtual elements may have a spatial dimension and an interaction volume, the interaction volume defining an area of interactivity with the one or more primitive virtual elements. A virtual frame may be formed for the virtual object. The virtual frame may be based on the shape boundary and being formed from the one or more primitive virtual elements, the virtual frame further having a frame boundary corresponding to the shape boundary, and the virtual frame having an interaction volume based on the interaction volumes of the one or more primitive virtual elements. The virtual frame may be superimposed over the virtual object in the virtual environment in order to facilitate the interaction with the virtual object in the virtual environment.

In various implementations, the virtual object corresponds to a virtual representation of a physical object (i.e., an object in the real world) in the virtual environment. The physical object may, but need not, include any physical item that has a counterpart in an application in the virtual environment.

In some implementations, the one or more primitive virtual elements are locked to the virtual frame, which may allow the virtual frame to move as a virtual rigid body in the virtual environment. Further, in some implementations, an instruction to move the virtual frame from a first virtual point in the virtual environment to a second virtual point in the virtual environment may be received, and the virtual frame and the virtual object may be moved, in response to the instruction, from the first virtual point to the second virtual point as a virtual rigid body.

In some implementations, the interaction corresponds to a request to move the virtual object in the virtual environment, and in these implementations, the virtual frame and the virtual object may be moved in accordance with the request.

In various implementations, the interaction comprises a request to rotate the virtual object along an axis orthogonal to a plane containing the virtual frame, and in these implementations, the virtual frame and the virtual object are prevented from rotating along the axis by a tension force that is assigned to the virtual frame and an associated anchor point.

In some implementations, the interaction comprises a request to move the virtual object in the virtual environment, and in these implementations, the virtual frame is moved at a virtual velocity from a first anchor point in the virtual environment to a second anchor point in the virtual environment. In an implementation, moving the virtual frame and the virtual object in the virtual environment comprises identifying an anchor strength between the first anchor point and the second anchor point, the anchor strength corresponding to a virtual tension between the first anchor point and the second anchor point, and in these implementations, the virtual velocity is related to the virtual tension.

In some implementations, the virtual frame is configured to resist movement when positioned at the first anchor point until the user interaction applies a specified virtual force to a user interaction element (e.g., a user interface element on a display or other device that is coupled to the display that is configured to receive the user interaction), the specified virtual force exceeding a predetermined force threshold assigned to the virtual frame.

In some implementations, identifying the shape boundary of the virtual shape may comprise identifying a polygon having a shape corresponding to the spatial dimensions of the virtual object, and the polygon having a shape boundary based on the shape. In some implementations, gathering the one or more primitive virtual elements to be associated with the shape boundary may comprise gathering one or more primitive virtual elements to form the polygon in the virtual environment, the one or more primitive virtual elements having a spatial dimension and an interaction volume, the interaction volume defining an area of interactivity with the one or more primitive virtual elements. In various implementations, identifying the shape boundary of the virtual shape may comprise identifying a bounding region of the virtual shape using a mesh of the virtual shape.

In some implementations, the polygon may comprise a rectangle and/or other shape that has at least two sides of different length. In an implementation, the polygon may have at least two sides of equal length. For instance, in an implementation, the polygon may have all sides of equal length.

In various implementations, the virtual frame may be built as an initial step, and the virtual object may then be introduced into to the virtual frame. The parameters of both the virtual frame and the virtual object may then be configured so that the virtual frame and the virtual frame translate and/or rotate as one unit in the virtual environment.

The following detailed description is merely exemplary in nature and is not intended to limit the described implementations (examples, options, etc.), or the application and uses of the described implementations. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable making or using the implementations of the disclosure and are not intended to limit the scope of the disclosure. For purposes of the description herein, the terms "upper," "lower," "left," "rear," "right," "front," "vertical," "horizontal," and similar terms or derivatives thereof shall relate to the examples as oriented in the drawings and do not necessarily reflect real-world orientations unless specifically indicated. Furthermore, there is no intention to be bound by any expressed or implied theory presented in the following detailed description. It is also to be understood that the specific devices, arrangements, configurations, and processes illustrated in the attached drawings, and described in the following specification, are exemplary implementations (examples), aspects and/or concepts. Hence, specific dimensions and other physical characteristics relating to the implementations disclosed herein are not to be considered as limiting, except in the context of any claims which expressly states otherwise. It is understood that "at least one" is equivalent to "a."

The aspects (examples, alterations, modifications, options, variations, implementations and any equivalent thereof) are described with reference to the drawings; it should be understood that the descriptions herein show by way of illustration various implementations in which claimed inventions may be practiced and are not exhaustive or exclusive. They are presented only to assist in understanding and teach the claimed principles. It should be understood that they are not necessarily representative of all claimed inventions. As such, certain aspects of the disclosure have not been discussed herein. That alternate implementations may not have been presented for a specific portion of the invention or that further alternate implementations which are not described may be available for a portion is not to be considered a disclaimer of those alternate implementations. It will be appreciated that many of those implementations not described incorporate the same principles of the invention and others that are equivalent. Thus, it is to be understood that other implementations may be utilized and functional, logical, organizational, structural and/or topological modifications may be made without departing from the scope and/or spirit of the disclosure.

These and other objects, features, and characteristics of the present disclosure, as well as the methods of operation and functions of the related components of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the any limits. As used in the specification and in the claims, the singular form of "a", "an", and "the" include plural referents unless the context clearly dictates otherwise.

DETAILED DESCRIPTION

Example System Architecture

Figure 1:
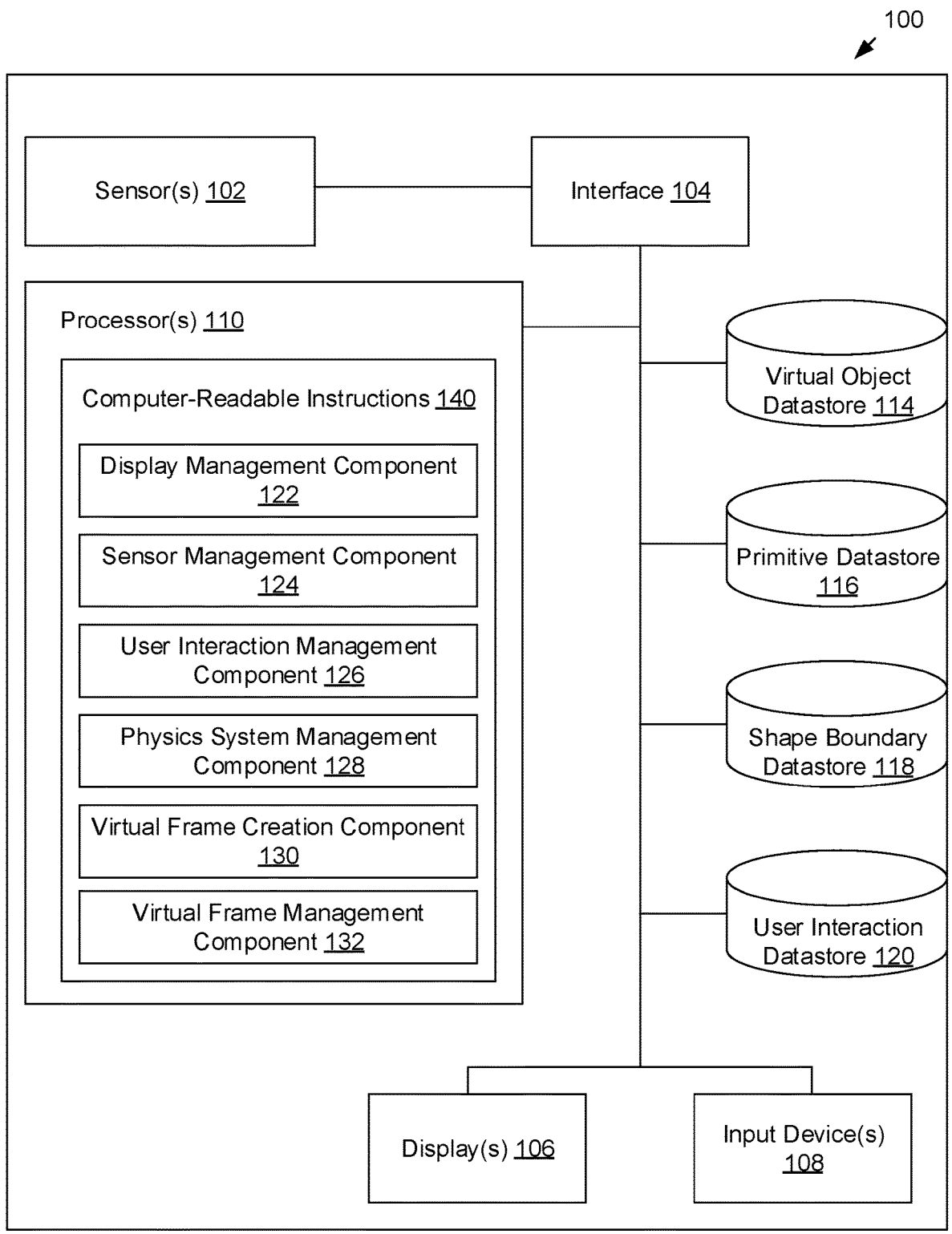
FIG. 1 illustrates an example of a virtual environment management system, in accordance with one or more implementations.

FIG. 1 illustrates an example of a virtual environment management system 100, in accordance with one or more implementations. The virtual environment management system 100 may include sensor(s) 102, an interface 104, display(s) 106, input device(s) 108, processor(s) 110, and one or more datastores, including a virtual object datastore 114, a primitive datastore 116, a shape boundary datastore 118, a user interaction datastore 120. One or more of the components shown in FIG. 1 may be coupled to one another or to components not explicitly shown in FIG. 1.

Sensor(s) 102, Interface 104, Display(s) 106, Input Device(s) 108, and Processor(s) 110

The sensor(s) 102 may include one or more devices that obtain data about a physical property (light, motion, velocity, distance, sound, heat, pressure, magnetism, etc.) in the physical world and provide one or more components of the virtual environment management system 100 with a signal that represents the data. In an implementation, the sensor(s) 102 include a motion sensor that senses movement of a user or of a component of the virtual environment management system 100. The sensor(s) 102 may also include an Inertial Measurement Unit (IMU), an accelerometer, a gyroscope, etc. that senses translational and/or rotational motion by a user or of a component of the virtual environment management system 100. In some implementations, the sensor(s) 102 include a camera that gathers images of a physical environment surrounding a user or a component of the virtual environment management system 100. The camera may comprise a still camera that captures still images of the physical environment or a motion camera that captures videos or other motion pictures of the physical environment. In various implementations, the sensor(s) 102 comprise a depth-camera. A "depth-camera," as used herein, may refer to a device or a component that has the capability to capture still and/or moving images, and has the ability to sense distances of objects away from it.

In various implementations, the sensor(s) 102 may form a part of a Virtual Reality (VR) system that senses the physical environment around a user. In these VR implementations, the sensor(s) 102 may include accelerometers, gyroscopes, etc. that provide movement data related to how a user is moving; the movement data may be used as the basis of perspectives, etc. used in a virtual environment managed by the VR system. A "virtual environment," as used herein, may refer to a virtual space that represents an environment, real or imaginary, and simulates a user's presence in a way that allows the user to interact with the environment. An example of a virtual environment is a VR environment. A virtual environment may, but need not, contain "virtual objects," which as used herein, may refer to any computer-generated objects that are displayed in the virtual environment but are not part of the physical world. A "virtual element" may include an element used to build or otherwise make up a virtual object, and in some cases may be synonymous with a "virtual object". Virtual elements and/or virtual objects may be assembled from primitives, discussed further herein. As also discussed further herein, the virtual environment may facilitate interactions with virtual objects. Examples of interactions include moving, resizing, rotating, etc. the virtual objects within the virtual environment. It is further noted that a "real world object" may comprise any object in the physical world, and may include animate items, inanimate items, physical objects/elements used to form the basis of a point cloud, etc.

Moreover, in some implementations, the sensor(s) 102 may form a part of an Augmented Reality (AR) system that uses a virtual environment to augment a physical environment to create an augmented, and/or "mixed reality", environment. An "augmented environment," as used herein, may refer to a space that represents a virtual environment that is superimposed over a perspective of a physical environment around a specific user. An augmented environment may include attributes of a virtual environment, including virtual objects superimposed over portions of the physical environment. In some implementations, an augmented environment may represent physical objects in the physical world as virtual objects in the augmented environment. The virtual objects may, but need not, appear to a user to be different from the physical objects that the virtual objects correspond to in the virtual environment. As an example, a virtual object representing a computer screen in an augmented environment may have the same size dimensions, etc., as the physical object (i.e., the computer screen); however, the virtual object may also have different size dimensions, etc., than the physical object. As discussed further herein, the augmented environment may facilitate interactions with virtual objects. Examples of interactions include moving, resizing, rotating, etc., the virtual objects within the augmented environment.

In VR and/or AR implementation, the sensor(s) 102 may include IMUs, accelerometers, gyroscopes, etc., that provide movement data related to how a user is moving; the movement data may be used as the basis of perspectives, etc. used in the virtual or augmented environment. Further, in an AR implementation, the sensor(s) may comprise or include a depth-camera used in an AR system to capture still and/or moving images of the physical environment and to provide distances of objects away from the depth-camera for processing and use in the AR environment.

The interface 104 may comprise any computer-readable medium that couples the other components of the virtual environment management system 100 to one another. In some implementations, at least a portion of the interface 104 includes a bus or other data conduit or data plane. In these implementations, at least two components of the virtual environment management system 100 are co-located on a single digital device. Further, in various implementations, at least a portion of the interface 104 includes a computer network or a part of a computer network. In these implementations, at least two components of the virtual environment management system 100 are located on different digital devices that are coupled to one another by the computer network. It is noted that the computer network may include a wireless or a wired back-end network or a Local Area Network (LAN). In some implementations, the computer network encompasses a relevant portion of a Wide Area Network (WAN) and/or other network.

The display(s) 106 may include one or more devices that display images and/or other data to a user. In some implementations, the display(s) 106 are implemented using Cathode Ray Tube (CRT), Plasma Display, Liquid Crystal Display (LCD), =Light Emitting Diode (LED) technologies, and/or fiber optic projection systems. The display(s) 106 may be configured to display a virtual environment, either alone (in replacement of the real world environment) or in an augmented environment. In some implementations, the display(s) 106 displays virtual objects, interactions with virtual objects, etc. In some implementations, the display(s) 106 comprise at least a portion of the input device(s) 108 as discussed further herein.

The virtual environment management system 100 may, but need not, include one or more input device(s) 108. The input device(s) 108 may include one or more devices that receive user input from a user. The input device(s) 108 may comprise physical keyboards, joysticks, mice, trackpads, other peripherals, and/or portions of a touchscreen display. As an example, the input device(s) 108 may, in some implementations, comprise portions of touch-screen displays that facilitate and/or initiate interactions with virtual environments supported by the systems and methods herein.

The processor(s) 110 may be configured to provide information processing capabilities in the virtual environment management system 100. In some implementations, the processor(s) 110 may include one or more of a digital processor, an analog processor, a digital circuit designed to process information, an analog circuit designed to process information, a state machine, and/or other mechanisms for electronically processing information.

Although processor(s) 110 is shown in FIG. 1 as a single entity, this is for illustrative purposes only. In some implementations, processor(s) 110 may include a plurality of processing units (e.g., a plurality of CPUs and/or GPUs). These processing units may be physically located within the same device, or processor(s) 110 may represent processing functionality of a plurality of devices operating in coordination. The processor(s) 110 may be configured to execute one or more computer-readable instructions 140. In some implementations, the processor(s) 110 is configured to execute the computer-readable instructions 140 by software, hardware, firmware, or some combination of software, hardware, and/or firmware; and/or other mechanisms for configuring processing capabilities on processor(s) 110.

Computer-Readable Instructions 140

The computer-readable instructions 140 may include a display management component 122, a sensor management component 124, a user interaction management component 126, a physics system management component 128, a virtual frame creation component 130, and a virtual frame management component 132.

It should be appreciated that although the display management component 122, the sensor management component 124, the user interaction management component 126, the physics system management component 128, the virtual frame creation component 130, and the virtual frame management component 132 are illustrated in FIG. 1 as being co-located within a single processing unit (e.g., the processor(s) 110), in implementations in which processor(s) 110 includes multiple processing units, one or more of the display management component 122, the sensor management component 124, the user interaction management component 126, the physics system management component 128, the virtual frame creation component 130, and the virtual frame management component 132 may be located remotely from the other components.

The description of the functionality provided by the display management component 122, the sensor management component 124, the user interaction management component 126, the physics system management component 128, the virtual frame creation component 130, and the virtual frame management component 132 described herein is for illustrative purposes, and is not intended to be limiting, as any of the display management component 122, the sensor management component 124, the user interaction management component 126, the physics system management component 128, the virtual frame creation component 130, and the virtual frame management component 132 may provide more or less functionality than is described. For example, one or more of the display management component 122, the sensor management component 124, the user interaction management component 126, the physics system management component 128, the virtual frame creation component 130, and the virtual frame management component 132 may be eliminated, and some or all of its functionality may be provided by other ones of the display management component 122, the sensor management component 124, the user interaction management component 126, the physics system management component 128, the virtual frame creation component 130, and the virtual frame management component 132. As another example, processor(s) 110 may be configured to execute one or more additional components that may perform some or all of the functionality attributed herein to one of components the display management component 122, the sensor management component 124, the user interaction management component 126, the physics system management component 128, the virtual frame creation component 130, and the virtual frame management component 132.

In some implementations, the computer-readable instructions 140 provide instruction to operate one or more applications including an operating system, a virtual 3D environment application, a physics engine and/or a gesture engine (e.g., if not included in the 3D environment application, various drivers (e.g., for the interfaces and communications of the system) in addition to other programs, for example, a browser application.

Display Management Component 122

The display management component 122 may include computer-readable instructions configured to manage the display(s) 106. In some implementations, the display management component 122 includes instructions for addressing portions of the display(s) 106 to display specific aspects of a virtual environment, either alone, or as part of an augmented environment. For example, the display management component 122 may include instructions to address specific pixels of the display(s) 106 with specific colors, images, virtual objects, etc. that are provided to the user as part of a virtual environment. In various implementations, the display management component 122 selects specific colors, images, virtual objects, etc. based on attributes of the physical environment surrounding a user to implement an augmented environment. In various implementations, the display management component 122 selects specific colors, images, virtual objects, etc. based on a state of a virtual environment and/or user interactions taken (e.g., user interactions taken on virtual objects) in the virtual environment.

Sensor Management Component 124

The sensor management component 124 may include computer-readable instructions configured to manage the sensor(s) 102. The sensor management component 124 may be coupled to graphics processing hardware, software, and/or firmware for processing images, and/or other hardware, software, and/or firmware for processing other forms of sensor data. In various implementations, the sensor management component 124 obtains image, depth, and/or other data from the sensor(s) 102 and extracts image information, depth and/or other positional information, etc. from the data. The sensor management component 124 may provide the extracted information to the physics system management component 128 and/or other components of the virtual environment management system 100.

User Interaction Management Component 126

The user interaction management component 126 may include computer-readable instructions configured to manage user interactions from devices that can receive user interactions, including but not limited to the input device(s) 108 and/or other devices coupled to the virtual environment management system 100. In some implementations, the user interaction management component 126 is coupled to peripheral processing hardware, software, and/or firmware that manages the devices that receive user interactions. The user interaction management component 126 may provide to the physics system management component 128 any user interaction data that is based on user input into the devices that receive user interactions. "User interaction data," as discussed herein, may refer to user input into the devices that receive user interactions, the input allowing a user to interact with at least a portion of a virtual environment supported by the virtual environment management system 100. In some implementations, the user interaction data comprises interactions with at least portions of a virtual environment, such as interactions with virtual objects in a virtual environment. The virtual environment may, but need not, be incorporated in an augmented environment, as discussed further herein.

In some implementations, the user interaction data managed by the user interaction management component 126 may be based on sensor data from the sensor(s) 102 and/or managed by the sensor management component 124. The sensor data may be based on images taken, e.g., by a still or motion camera coupled to and/or implemented by the sensor(s) 102. The sensor data may be based on depth points (e.g., points along a line orthogonal to the sensor(s) 102) taken by a depth-sensor coupled to and/or implemented by the sensor(s) 102. In various implementations, the sensor data is taken from gyroscopes, accelerometers, and/or other motion sensors coupled to and/or implemented by the sensor(s) 102.

In various implementations, the user interaction management component 126 identifies portions of the virtual environment that correspond to specific user interactions. The user interaction management component 126 may identify where sensor data obtained from the sensor(s) 102 and/or managed by the sensor management component 124 is to be projected into a virtual environment managed by the virtual environment management system 100. As examples, the user interaction management component 126 may identify if/whether specific gestures are related to known virtual points, etc. in the virtual environment. The user interaction management component 126 may further identify whether these virtual points correspond to locations of virtual objects, virtual frames, etc. in the virtual environment. In various implementations, the user interaction management component 126 may modify a state, a property, etc. of a virtual object, virtual frame, etc. based on one or more user interactions. The user interaction management component 126 may, for instance, modify an interactive volume of a virtual object and/or a virtual frame based on user interaction data.

Physics System Management Component 128

The physics system management component 128 may include computer-readable instructions configured to manage a physics system for a virtual environment supported by the virtual environment management system 100. A "physics system," as used herein, may refer to a set of rules that govern physical relationships of virtual objects in the virtual environment. In some implementations, the physics system implemented by the physics system management component 128 may implement rules for force determination in the virtual environment, rules to select and/or manage primitives that form the basis of virtual objects in the virtual environment, rules to define interactive volumes of virtual objects in the virtual environment, and/or rules that allow for and/or define manipulation of virtual objects in the virtual environment.

Force Determinations by Physics System Management Component 128

In some implementations, the physics system management component 128 implements force determinations for virtual objects in a virtual environment. In various implementations, the physics system management component 128 accesses the data file related to virtual objects from the virtual object datastore 114, and implements force determinations on these virtual objects based on rules assigned to those virtual objects and/or user interaction data from the user interaction management component 126.

One example of the types of force determinations that may be applied includes force determinations based on virtual electromagnetic forces between virtual objects in the virtual environment. Though the discussion herein discusses force determinations based on virtual electromagnetic forces (e.g., on Coulomb's Law) in greater detail, it is noted that the physics system management component 128 may determine virtual forces between virtual objects based on any virtual physical forces and/or other forces, including but not limited to virtual gravitational forces, virtual thermodynamic forces, virtual chemical forces, virtual atomic weak forces, virtual atomic strong forces, etc.

Figure 2:
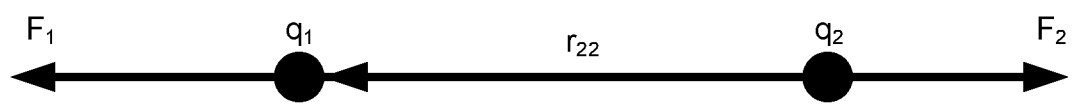
FIG. 2 illustrates an example of a force diagram showing manipulation of virtual Input/output (I/O) elements using forces, in accordance with one or more implementations.

As a result, in some implementations, the physics system management component 128 determines forces between virtual objects based on virtual electromagnetic forces between the virtual objects. Turning to FIG. 2, FIG. 2 shows an illustration 200 of an example of how force may be applied to virtual elements and/or virtual objects. By assigning a charge to a point associated with a virtual element and a separate charge to a point of input associated with a real world element and/or real world object detected by a sensing device, the elements' interaction can be governed by Coulomb's Law, which models the electric forces between two charges. For example, the magnitude of the electrostatic force of interaction between two point charges can be programmed to be directly proportional to the scalar multiplication of the magnitudes of charges and inversely proportional to the square of the distance between them. The force is applied along the straight line joining the points. If the two points have the same charge (e.g., positive and positive), the virtual electrostatic force between them is repellant (e.g., the points try move away from one another); if the two points have different charges (e.g., positive and negative), the virtual force between them is attractive (e.g., the points try to move towards one another), as shown in FIG. 2.

Coulomb's law can be stated as a mathematical expression. The scalar and vector forms of the mathematical equation are given by:

$$|F| = k_e \frac{|q_1 q_2|}{r^2} \qquad \text{Equation 1}$$

-continued and $$|F| = k_e \frac{|q_1 q_2|}{|r_{21}|^2} \hat{r}^{21},$$  Equation 2 respectively, where $k_e$ is Coulomb's constant $k_e$=8.9875× $10^9$ N·m$^2$·C$^{-2}$ and $q_1$ and $q_2$ are the signed magnitudes of the charges, the scalar r is the distance between the charges, the vector $r_{21}=r_1-r_2$ is the vectorial distance between the charges, and $$\hat{r}^{21} = \frac{r_{21}}{|r_{21}|} \text{ (a unit ventor pointing from } q_2 \text{ to } q_1\text{)}.$$  Equation 3

For example, as shown in FIG. 2, if $q_2$ represents a point charge of an input from a sensor (e.g., a depth sensor) corresponding to a coordinate from a point cloud associated with a real world element and $q_1$ is a point charge associated with the virtual element, then the vector form of the equation calculates the force $F_1$ applied on $q_1$ by $q_2$. The determined force can be applied to the virtual element according to one or more properties associated with the virtual element. In one implementation, a derivative of Coulomb's law is applied to simplify the computation of force applied to a virtual element. For example, the constant $k_e$ and $q_1$ can be replaced by a single constant K, if the point charges on the primitive are constant at that instance, which is given by:

$$|F_1| = K \frac{q_2}{|r_{21}|^2} \hat{r}^{21}$$  Equation 4

Furthermore, other force mapping functions can be used to compute force applied to a virtual element—for example, to create a different behavior resulting from the force interaction. For example, the distance may be mapped to the force computation using a reciprocal function (e.g., F α1/r$^4$) to obtain a faster rate of force application (e.g., when a faster response time is desired form a force interaction).

Use of Primitives by the Physics System Management Component 128

Returning to FIG. 1, in some implementations, the physics system management component 128 may access a data file in the primitive datastore 116 that contains primitives corresponding to virtual elements and/or virtual objects. Virtual elements may be expressed as one or more primitives. The data file may store information related to one or more primitives, coordinates, assigned content and/or graphics that correspond to virtual elements modeled in the 3D virtual environment. In one example, primitives may be thought of the building blocks of virtual elements in the 3D virtual world. Primitives include a number of parameters, which may be assigned according to the properties desired for the corresponding virtual element. For example, parameters may include at least a type, a charge, a field, a size, one of more constraints, and coordinates. A charge combined with a field describes an interactive volume of a virtual element.

A primitive's "type," as used herein, may include an identifier (ID) specifying the geometry of the primitive. Types of primitives include a point, a line or a line segment, a plane (or subset of a plane with a boundary condition, such as a circle or rectangle), an ellipsoid (e.g., a sphere), a cylinder, and a torus, which are described in more detail below. The geometric models may be specified by piecewise parametric equations corresponding to a shape and/or a size of the primitive.

In an implementation, the charge parameter of a primitive may be positive, negative, or no charge (e.g., 0)) and have a magnitude (e.g., 0<q<100). If the charge of the virtual element is the same as the charge associated with a point from a sensor input, then the force applied by the sensor input on the virtual element may be repellant, and if the charge of the virtual element is the opposite to the charge associated with a point from a sensor input, then the force applied by the sensor input on the virtual element may attractive, for instance. In an implementation, a primitive may have multiple charges.

A "field" of the primitive, as used herein, may define an interactive boundary, or area of interactivity, of the primitive within the virtual environment. When the field is combined with a charge, it may define an "interactive volume" that specifies interaction with translated real world objects. In one example, the field parameter (e.g., 0 cm<$d_f$<=10 cm) is a distance d measured by a line segment of length d orthogonal to the core of the primitive at which, when coordinates of a sensor input are determined to be within it, the primitive becomes interactive (e.g., responds to forces acting on the primitive according to a charge associated with the field). Alternatively, the distance $d_f$ may be measured as a line segment of length d orthogonal to a core associated with the virtual element. When coordinates of a sensor input are determined to be within the boundary defined by the parameter, virtual object becomes active or interactive and is capable of responding in a defined manner to the sensor input (e.g., responsive to the application of force from the sensor input according to a charge associated with the field).

A primitive may have multiple interactive volumes. In some implementations, a primitive has at least two interactive volumes. For example, a primitive may have a first charge (e.g., zero charge) that is applied from the core to a first field distance, and a second charge (e.g., a positive or negative charge) that is applied between the first field distance and a second field distance. To continue the example, from the core to a first distance (e.g., 0 cm<=$d_{fcore}$<=5 cm), the primitive can have a zero charge to generate a neutral interactive volume. Within the neutral interactive volume, no forces are applied to the virtual element associated with the primitive and thus no force computation is performed. In an implementation, providing a neutral interactive volume around the core of a primitive prevents an infinite amount of force from being applied to the primitive and its related virtual element, for example, at an instance due to an attempt to divide by zero during a force calculation, which can result in unwanted manipulation of a virtual element. In an example, the neutral interactive volume may be roughly correlated to the visual size or portion of the rendering of a virtual element as it appears to a user. In addition, from the first distance to the second distance (e.g., 5 cm<$d_{fforce}$<=10 cm), the field has a charge (e.g., positive or negative) that creates a repellant interactive volume (e.g., charge of field is same as charge associated with a sensor input) or an attractive interactive volume (e.g., charge of field is opposite to a charge associated with a sensor input) that governs the way that applied force (as defined by the sensor input) acts on the primitive. Beyond the second distance, the primitive is inactive. Examples of these interactive volumes are shown in conjunction with the primitives illustrated in FIGS. 3A, 3B, 3C, 3D, 3D, and 3F.

Figure 3A:
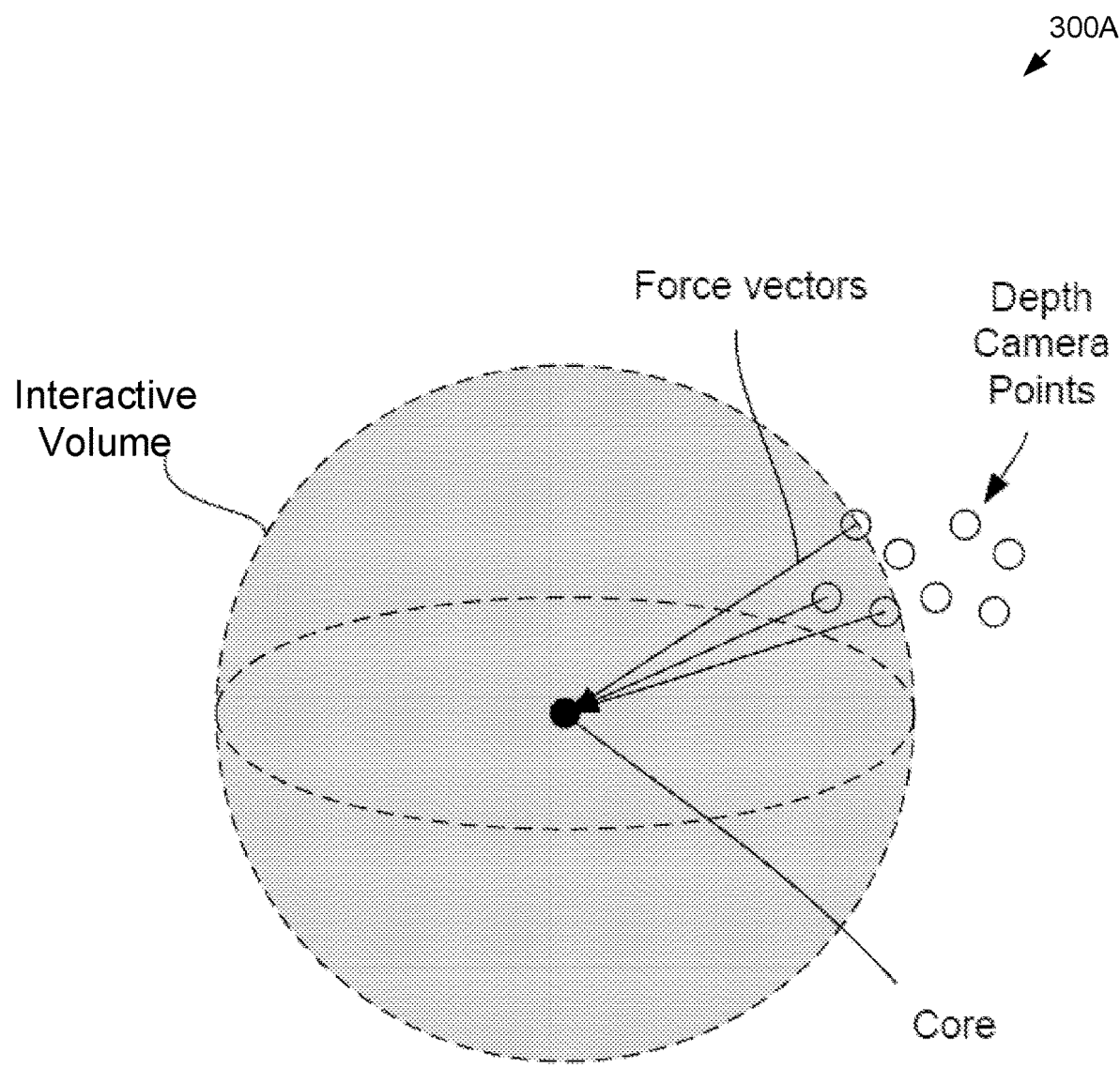
FIGS. 3A, 3B, 3C, 3D, 3E, and 3F show examples of primitives that may be used to build virtual elements, in accordance with one or more implementations.
Figure 3B:
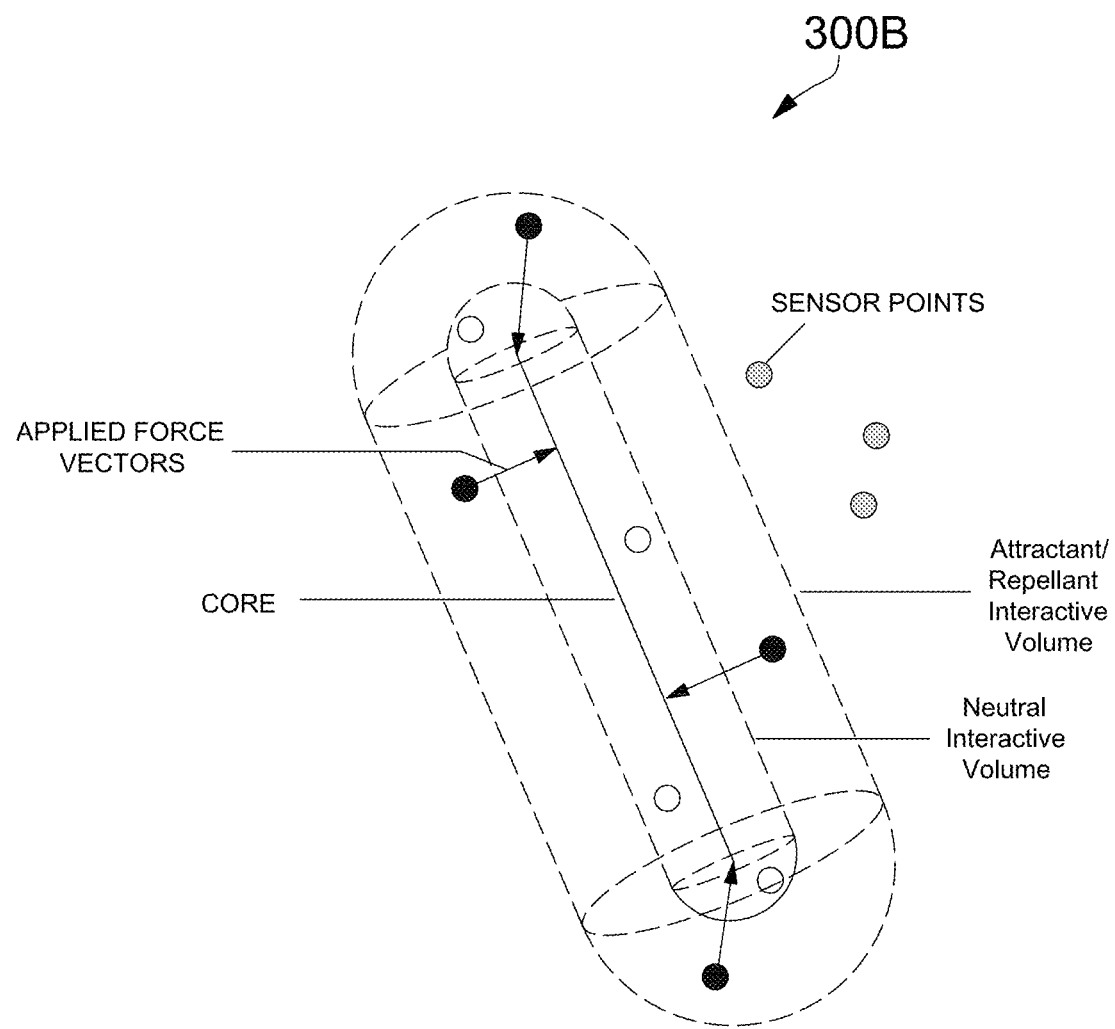
Figure 3C:
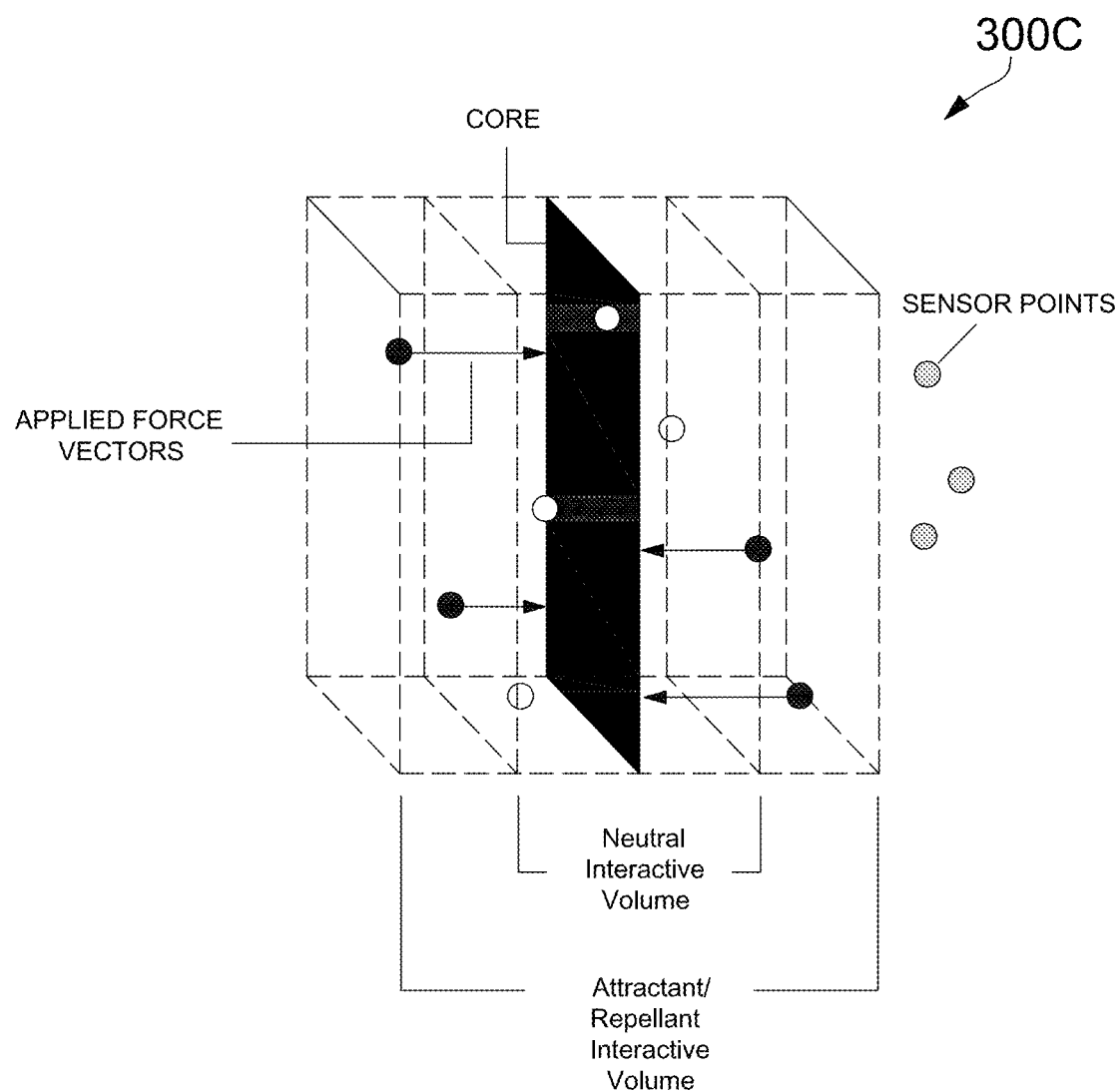
Figure 3D:
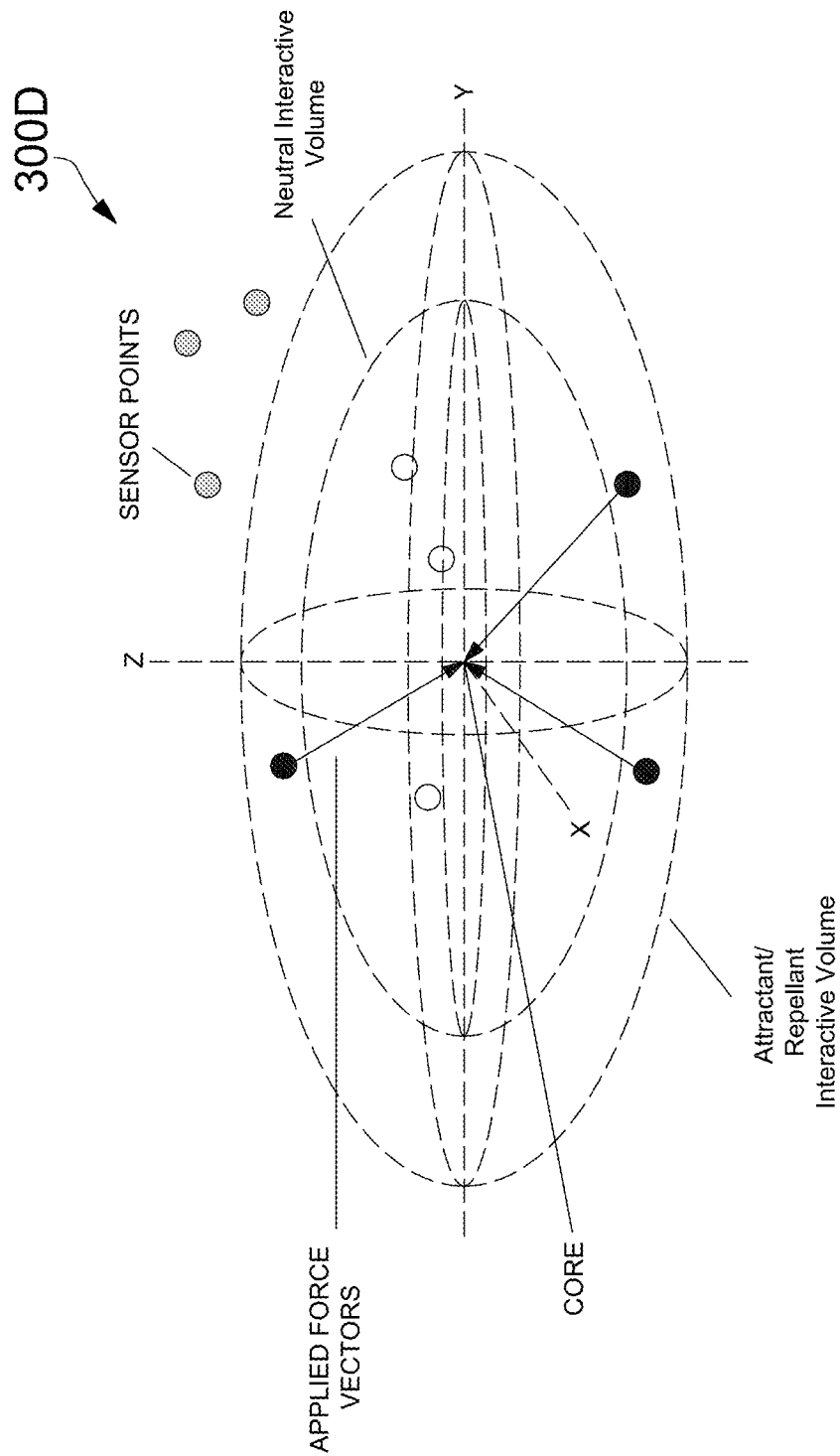
Figure 3E:
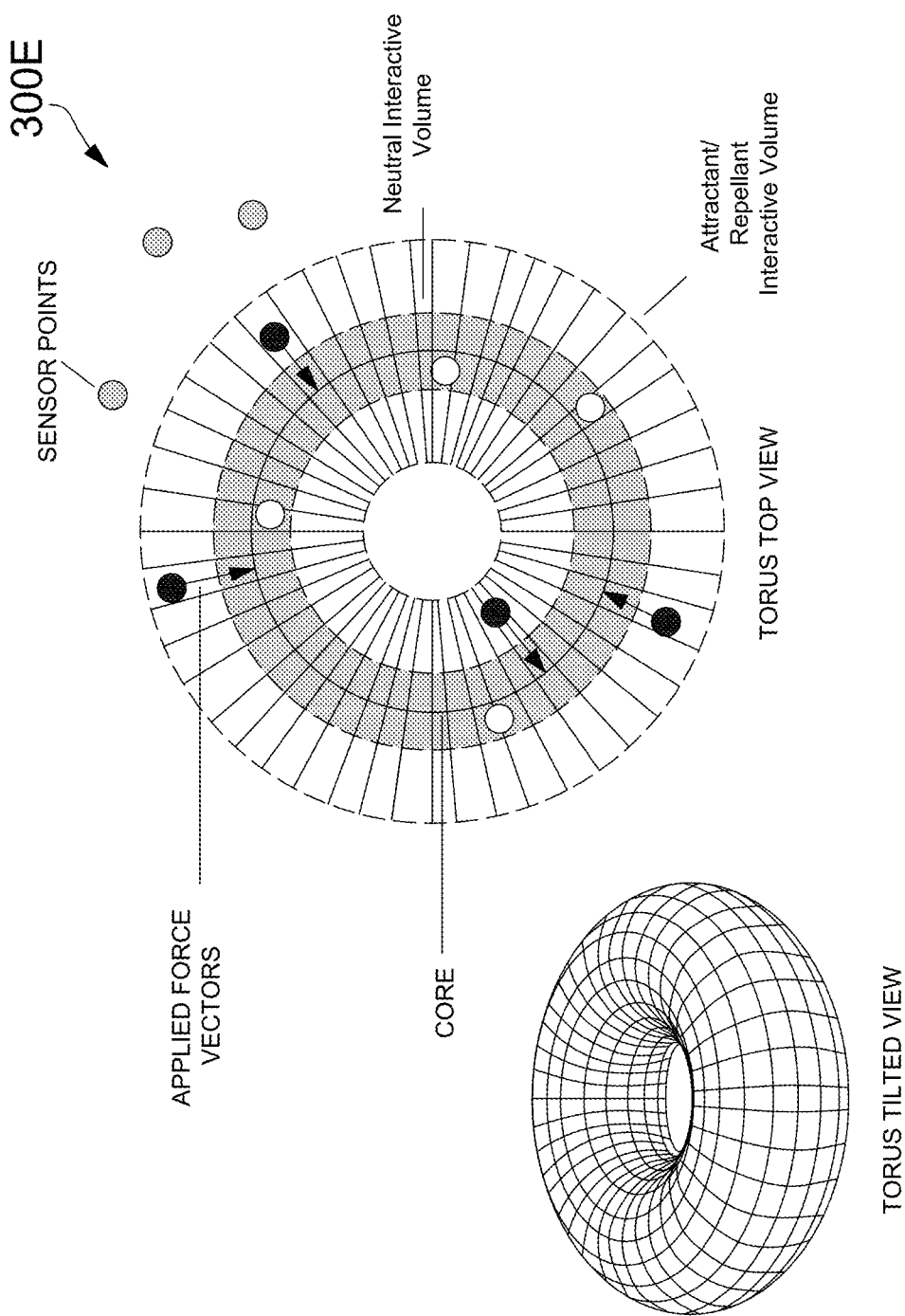
Figure 3F:
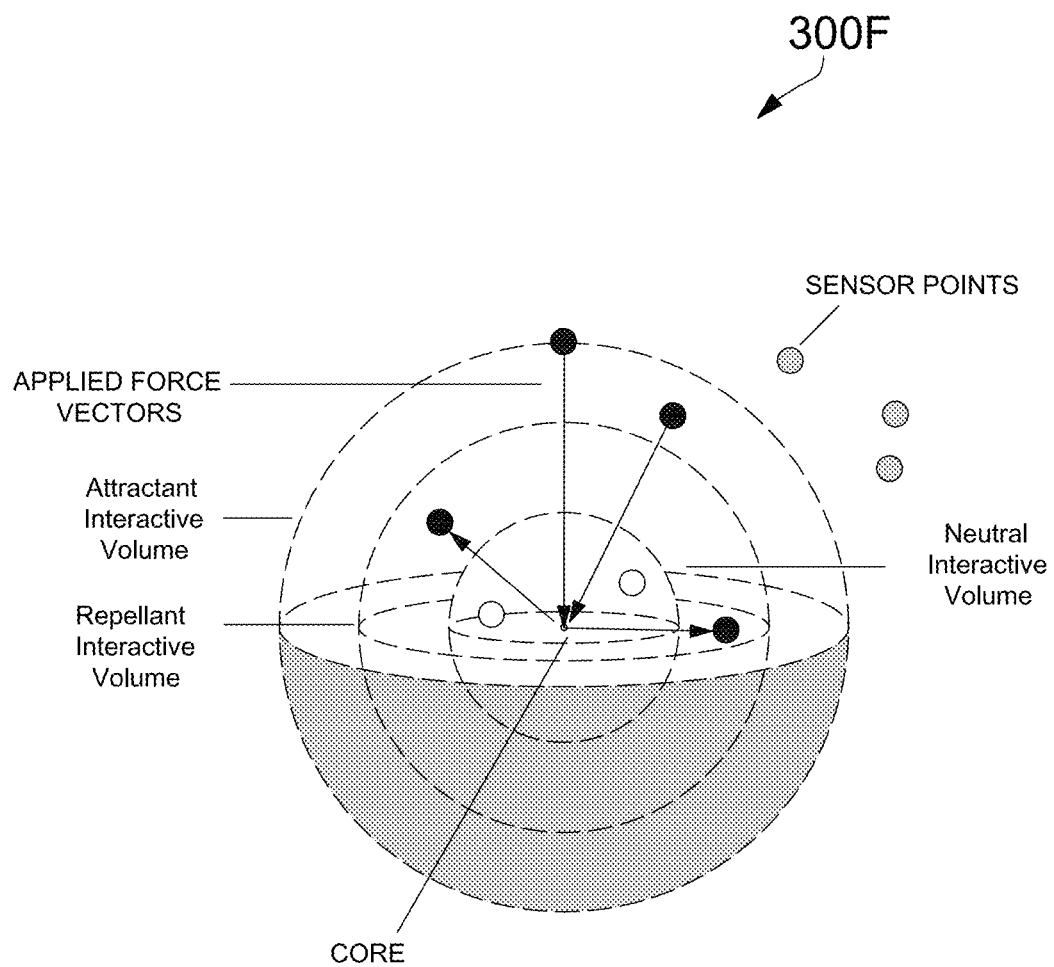

In some implementations, a primitive has three interactive volumes: an inner neutral interactive volume, an intermediate repellant interactive volume, and a third outer attractive interactive volume. In this example, the combination of interactive volumes allows a virtual element to be moved and "held" in space as the attraction and repellent forces balance in an equilibrium state (e.g., the force of repulsion is substantially equal to the force of attraction at a specified distance from the core). An example of a primitive with three interactive volumes configured in this fashion is shown in FIG. 3F. For example, assume a primitive has neutral interactive volume (e.g., 0 cm<=$d_{fcore}$<=5 cm, charge=zero), a repellant interactive volume (e.g., 5 cm<$d_{frepel}$<=10 cm charge=positive), and an attractive interactive volume (e.g., 10 cm<$d_{fattract}$<=20 cm charge=negative), and a sensor input has a positive charge. As a sensor input coordinates move within a distance of 20 cm of the primitive, the primitive experiences an attractive force and moves toward the sensor input. As long as the sensor input maintains a distance (e.g., 10 cm<$d_{sensorinput}$<=20 cm), the primitive continues to be attracted or move towards the sensor input. If the sensor input remains in place over time, the primitive continues to be attracted and moves towards the coordinates of the sensor input until the distance from the core of the primitive reaches 10 cm. At this point, the object stops, as the attractive force generated by the attractive interactive volume equals the repellant force generated by the repellant interactive volume. In this sense, a virtual element is held in the virtual space. If the sensor input coordinates move within 10 cm, the primitive experiences a repellant force and movers away from the coordinates of the sensor input, giving the primitive the appearance of body or substance to the user. As long as the sensor input maintains a distance (e.g., 5 cm<$d_{sensorinput}$<=10 cm), the primitive continues to be repelled and moves away from the sensor input. If the sensor input moves within 5 cm no force is applied to the primitive, for example, to prevented unwanted force calculations and/or virtual element manipulation.

For example, if points from a depth camera related to the sensor(s) 102 correspond to a user's hand and the primitive described in the previous paragraph (e.g., the discussion related to FIG. 3F) is incorporated into a virtual element in a virtual 3D space, the user may reach towards the virtual element, breaking the outer interactive volume of an associated primitive, and causing the virtual element to be attracted to the user's hand to the point of equilibrium between the attractive and repellent interactive volumes associated with the primitive (i.e., until it is within 10 cm of the translated coordinates of the user's hand), at which point the virtual element will come to rest. If the translated coordinates of the user's hand maintain this distance relative to the virtual element, the virtual element moves with the translated hand as long as this distance is maintained. In this manner, a user may "hold" the element. For example, when in this "hold" position, if the user's hand moves closer to the virtual element, the virtual element will move away of the user's hand, seemingly responding to the movement of the user's hand as it appears to hold the virtual element. Conversely, if the user moves his or her hand away from the virtual element with sufficient velocity, the sensor points representing the user's hand will leave the attractive interactive volume around the virtual object, and the hand will appear to release or shake off its hold of the virtual element.

In an example, a virtual element may be held using two forces (e.g., a neutral interactive volume surrounded by an attractive interactive volume) in a similar manner; however, in this instance, the virtual element can be penetrated (e.g., as there is no repellant interactive volume).

Visual parameters of the primitive may be used to define the visual properties of the primitive. For example, a size, color, and a texture parameter may be provided and used in rendering of the primitive in the virtual 3D space. In addition, a link, identifier, or pointer may be used to associate and/or map virtual content to the primitive. For example, graphics of a web page may be mapped to a panel primitive simulating a virtual 3D multi-touch pad, while allowing a user to perform click or gestures inputs on a virtual web panel.

"Constraints" of the primitive can be used to define how the primitive responds to forces exerted on the primitive when the primitive is active. For example, a force vector and a constraint (among other parameters) may be input to a physics engine or other logic program to simulate the dynamics of the virtual 3D environment and to determine a response of the primitive to the application of the force. Examples of constraint parameters may include: drag, angular drag, mass, and center of mass, and trajectory. Drag is the force exerted in the direction opposite to the translation velocity of a primitive (e.g., 0<dragx<1, 0<dragy<1, 0<dragz<1). Angular drag is the force applied in the direction opposite to the rotational velocity of a primitive (e.g., 0<dragangular<1). Mass is the resistance of the primitive to being accelerated by a force applied to the primitive. In one example, the mass of a virtual element in the 3D virtual space may be 0.1 kg<mass<10 kg; however, other amounts and units of measurement may be used. Center of mass is the point (e.g. cm=(x, y, z)) of the primitive where a force may be applied causing the primitive to move in the direction of the applied force without rotation. Trajectory is a predefined path an object can travel in a 3D virtual space, and it constrains the possible movement of the 3D virtual object (e.g., moving on a curve). In addition, the primitive has coordinates (e.g., $p_1$=(x, y, z)) associated therewith to define its position in a virtual space and where the primitive is rendered for display.

Interactive Volumes and Interactivity by Physics System Management Component 128

Returning to FIG. 1, in some implementations, the physics system management component 128 implements interactivity. As discussed herein, primitives can be assigned an interaction volume that forms an interactive boundary that is used to determine whether—and under what circumstances—a primitive is interactive (e.g., the primitive may respond to a force based on its associated properties). For example, the interaction volume can be expressed by at least one distance parameter $d_f$ and an associated charge. The distance defines a boundary formed around the primitive at the distance $d_f$ measured orthogonally from the core of a primitive. In another example, the interaction volume can be expressed by multiple boundaries $d_{inner}$ and $d_{outer}$ (e.g., $d_{inner}$<$d_f$<=$d_{outer}$) measured orthogonally from the core of a primitive and a charge. Examples of interaction volumes in relation to various sensor input points are illustrated in FIGS. 3A, 3B, 3C, 3D, 3D, and 3F for the various primitive types. When one or more sensor inputs (e.g., coordinates of a point from the point cloud associated with a real world element) are within the boundary defined by the interaction volume, the primitive becomes interactive and force may be applied to the primitive. Thus, in one example, the interaction volume boundary can reduce the computational burden associated with processing of virtual elements in a virtual 3D space by only determining forces and/or other computations associated with virtual element that is within range of a point cloud. As a result, any point cloud that is not within the boundary of the interaction volume is not is not involved in any computation associated with the virtual elements.

Figure 4:
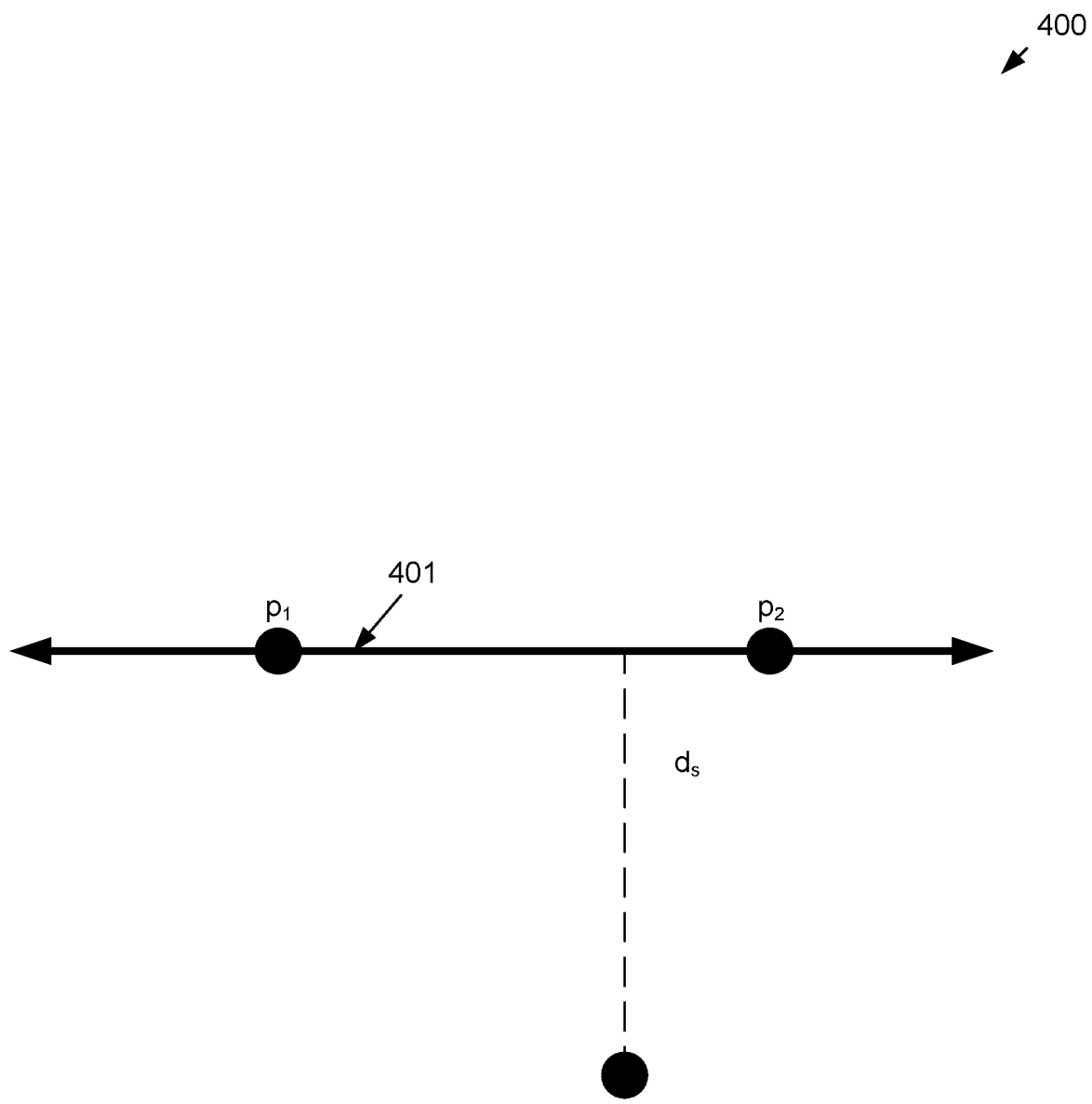
FIG. 4 illustrates an example of a boundary of an interactive volume of a primitive, in accordance with one or more implementations.

FIG. 4 illustrates an example 400 of a boundary of an interactive volume of a primitive, in accordance with one or more implementations. Included in FIG. 4 is a primitive 401. In this example, the primitive 401 may be interactive when the distance ds, corresponding to the length of a straight line segment orthogonal to a point on the core of the primitive extending from the point on the core to the coordinates of the point associated with an input from a sensor, is less than $d_f$. FIG. 4 illustrates one example of this determination for a line primitive. As shown in FIG. 4, a line primitive is expressed by two points $p_1$ $(x_1, y_1, z_1)$ and $p_2$ $(x_1, y_1, z_1)$ on the line segment 301. $p_{input}$ $(x_{input}, y_{input}, z_{input})$ represents the input point from a sensor corresponding to a real world object. The shortest distance $d_s$ from $p_{input}$ to the line segment may be determined as:

$$d_s = \frac{|(p_{input} - p_1) \times ((p_{input} - p_2)|}{|p_2 - p_1|} \quad \text{Equation 5}$$

In this example, if $d_s < d_f$, then primitive 401 may be interactive

Virtual Element Manipulation by Physics System Management Component 128

Figure 5:
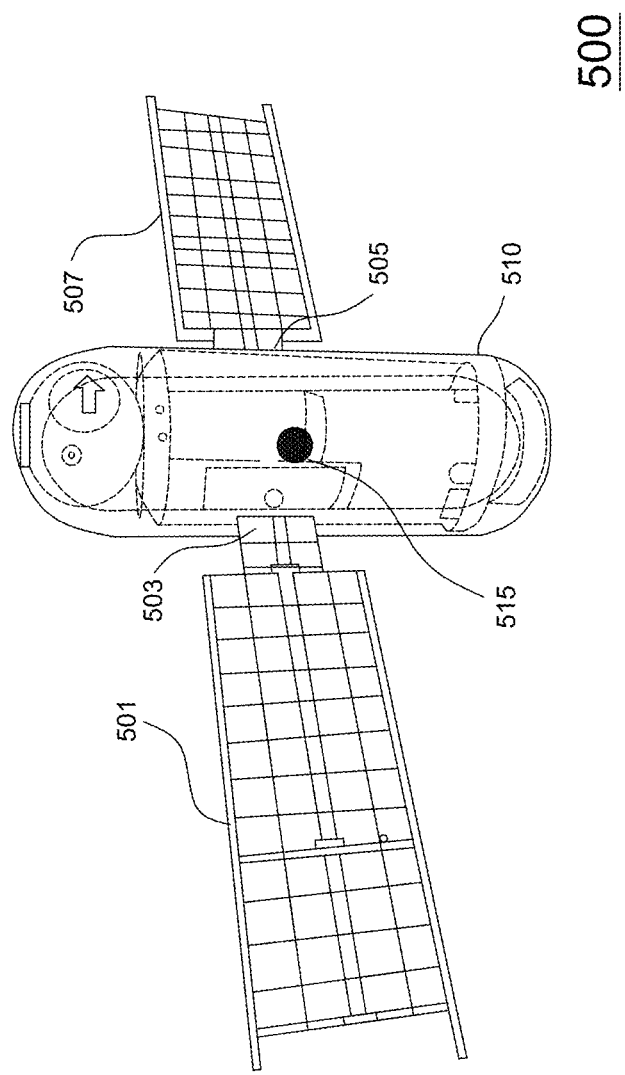
FIG. 5 illustrates an example of application of one or more primitives to content, in accordance with one or more implementations.

Returning to FIG. 1, in some implementations, the physics system management component 128 enables manipulation of virtual elements. The manipulation of virtual elements may, but need not, depend on interactive force determinations, properties of primitives, and/or interactive volumes/interactivity discussed further herein. As an example, FIG. 5 illustrates an example 500 of the application of primitives to define content in a virtual 3D space and therefore make the content interactive (according to the parameters assigned to any underlying primitive associated with the content). In one example, content of a graphics data file includes data to render virtual 3D graphics depicting a satellite telescope in a virtual 3D space. In order to make the content interactive in the virtual space, one or more primitives are associated with the content. In one example, primitives may be utilized in a modular fashion to emulate the perceived shape of the content and to make content interactive in the virtual world. For example, four plane primitives 501, 503, 505, 507 and a cylinder primitive 510 are mapped to the content of the graphics file to create a virtual element with a center of mass 515. Together, the primitive and the graphics content create a rigid body, in which the rotation and translations of the body are coupled.

Figure 6A:
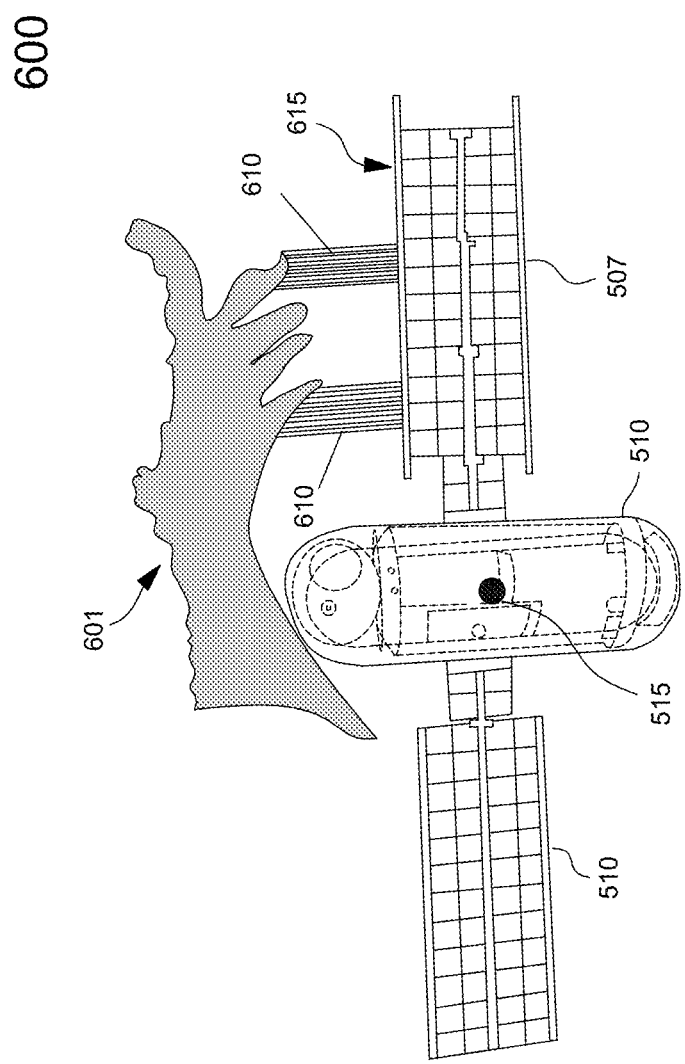
FIGS. 6A and 6B illustrate examples of application of sensor inputs, vectors, and primitives to content, in accordance with one or more implementations.
Figure 6B:
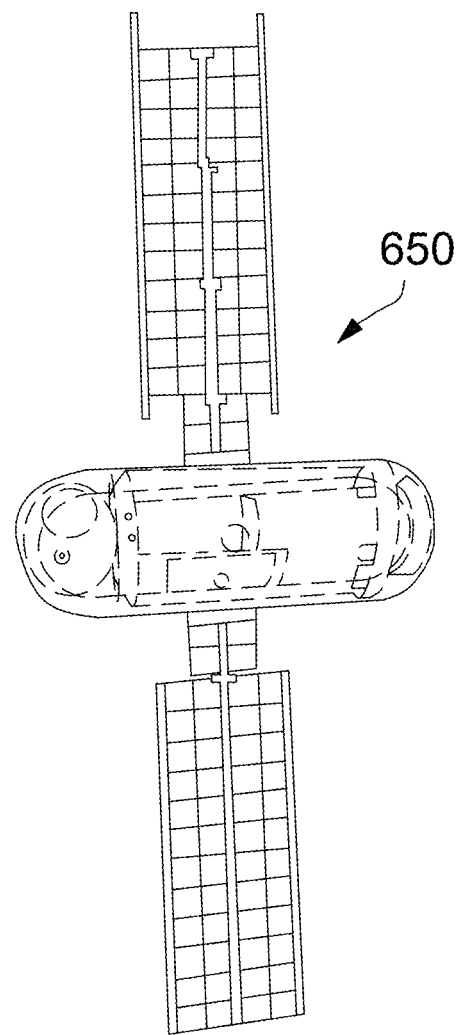

FIG. 6A illustrates an example 600 of the rendering of the virtual element of FIG. 5 (e.g., a satellite telescope) including a visual representation of point cloud 601 derived from sensor input (e.g., depth coordinates of a hand of user). FIG. 6A shows a first orientation 600 of the satellite telescope. Force vectors 610 are illustrated as lines extending from the hand to an edge 615 of the plane primitives 507. As the point cloud of the user's hand moves towards the edge of the plane primitive 507, a force is applied to the edge causing the primitives 501, 503, 505 507, and 510 and the associated content to rotate about the center of mass 515 to a new orientation 650 in the virtual space, as shown in FIG. 6B. One skilled in the art will appreciate that the illustration of the force vectors 610 as white lines is shown in FIG. 6A to aid understanding of the implementation of FIGS. 5, 6A, and 6B, and actual rendering of a virtual 3D space does not require graphic depiction of the force (much in the way force is not seen in the real world), unless depicting the force is desired in any particular application (e.g., a user tutorial on how to interact with a virtual environment). Similarly, the point cloud 601 corresponding to the sensor input does not have to be rendered or depicted unless desired. For example, in an augmented reality application, the point cloud may not be illustrated; the hand of a user may be directly viewed within the rendered virtual space interacting with the virtual elements. In another example, in a virtual reality application, the point cloud or some other visualization associated therewith can be rendered in the virtual space to aid the user in controlling, manipulating, and interacting with virtual element to show a corresponding location of the real world element and translated into the virtual world in relation to the virtual elements.

Virtual Frame Creation Component 130

The virtual frame creation component 130 may include computer-readable instructions to create virtual frames for virtual objects. The virtual frames may be based on approximate shapes of virtual objects. In some implementations, the virtual frame creation component 130 obtains shape boundaries of a virtual object from the shape boundary datastore 118. The virtual frame creation component 130 may further gather primitives (e.g., line primitives) from the primitive datastore 116 to create frame boundaries that correspond to the shape boundaries of the polygon that was obtained. A primitive may have associated with it interactive volume(s), visual parameters, constraints, etc.

In an implementation, a primitive comprises a line primitive that has associated with it three interactive volumes: a first neutral interactive volume near a central axis, a second attractive interactive volume that beings at the end of the first interactive volume and continues to a first predetermined distance orthogonal to the central axis, and a third repellant interactive volume that begins at the first predetermined distance and continues to a second predetermined distance orthogonal to the central axis of the line primitive. In some implementations, the third interactive volume is configured to change colors (e.g., to "glow" by, e.g., using the techniques described in U.S. Prov. Pat. App. Ser. No. 62/296,480, entitled, "Virtual Image Interaction Feedback,' filed Feb. 17, 2016, which is hereby incorporated by reference herein) when a user is within it. It is noted that other types of primitives and other types of properties are possible without departing from the scope and substance of the inventive concepts described herein.

In some implementations, the virtual frame creation component 130 configures the virtual frame as a rigid body in the virtual environment. More particularly, in these implementations, the virtual frame creation component 130 sets properties of the virtual frame so that any user request to translate or rotate a portion of the virtual frame causes the entire virtual frame to translate/rotate. The virtual frame creation component 130 may further set other properties of the virtual frame for usability and/or to increase the user experience with the virtual environment. As an example, the virtual frame creation component 130 may set rotational properties of the virtual frame in order to prevent the virtual frame from being rotated around any axis running through the plane of the virtual frame. As another example, the virtual frame creation component 130 may set rotational properties of the virtual frame in order to allow the virtual frame to rotate around an axis running orthogonal to the plane of the virtual frame.

In some implementations, the virtual frame creation component 130 may superimpose the virtual frame on the virtual object being modeled. The virtual frame creation component 130 may further configure parameters of the virtual environment to "lock" the virtual frame to the virtual object. The virtual frame creation component 130 may set parameters of both the virtual frame and the virtual object so that the virtual frame and the virtual object translate and/or rotate as one unit in the virtual environment. The virtual frame creation component 130 may, but need not, store the "locked" virtual frame and virtual object in any datastore, including, but not limited to the virtual object datastore 114.

In various implementations, the virtual frame creation component 130 may build the virtual frame and add or introduce the virtual object into the virtual frame. The virtual frame creation component 130 may configure parameters of the virtual environment to "lock" the virtual object to the virtual frame. The virtual frame creation component 130 may set parameters of both the virtual frame and the virtual object so that the virtual frame and the virtual frame translate and/or rotate as one unit in the virtual environment. The virtual frame creation component 130 may, but need not, store the "locked" virtual frame and virtual object in any datastore, including, but not limited to the virtual object datastore 114.

Turning to FIGS. 7A, 7B, 7C, 7D, 7E, and 7F, the figures illustrate screen captures 700 of a virtual environment modeling system used to model creation of a virtual frame for a virtual object in a virtual environment, in accordance with some implementations. The screen captures 700 illustrate operations that the virtual frame creation component 130 may take when creating a virtual frame for a virtual object. Though the virtual object is shown as rectangular for simplicity, it is noted the virtual object may comprise any shape that can be bounded by a polygon. It is further noted the virtual frame creation technique illustrated herein is by way of example only, and that the virtual frame creation component 130 may create virtual frames for virtual objects in other manners without departing from the scope and substance of the inventive concepts described herein.

Figure 7A:
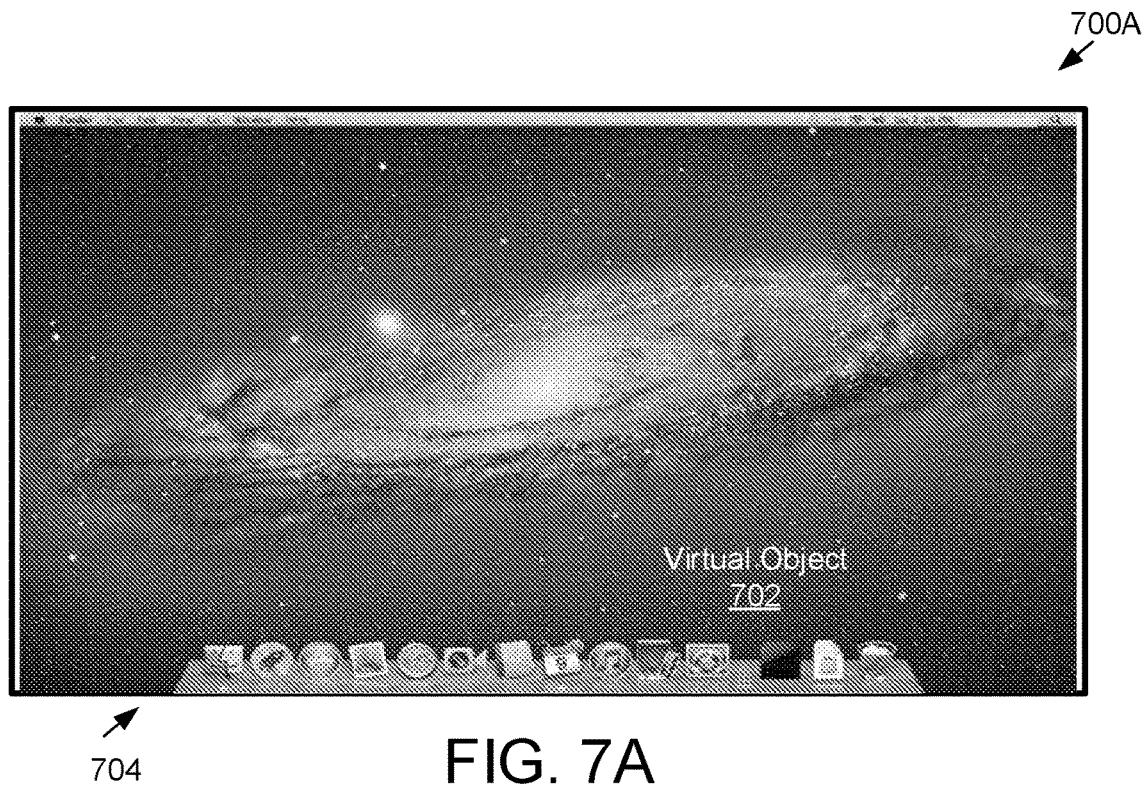
FIGS. 7A, 7B, 7C, 7D, 7E, and 7F illustrate screen captures of a virtual environment modeling system used to model creation of a virtual frame for a virtual object in a virtual environment, in accordance with some implementations.

Turning to FIG. 7A, the figure shows a screen capture 700A of a virtual environment modeling system used to model creation of a virtual frame for a virtual object in a virtual environment, in accordance with some implementations. The screen capture 700A more particularly shows a virtual object 702, which in this example, comprises a virtual computer screen that is represented as a virtual object in a virtual environment. As an item in the virtual environment, the virtual object 702 may have associated with it the ability to interface with a user. For example, the virtual object 702 may allow a user to virtually "touch" portions of it, and provide computer functionalities in response to those touches. The computer functionalities may include, for instance, the ability to access application and/or process functionalities, the ability to access operating system functionalities, etc. In various implementations, the virtual frame creation component 130 may identify object boundaries of the virtual object 702, and may obtain a polygon 704 that has shape boundaries that correspond to the object boundaries of the virtual object 702. In this example, the virtual frame creation component 130 may gather a rectangle from the shape boundary datastore 118 having a length and a width approximately equal to the length and width of the virtual object 702 in the virtual environment.

Figure 7B:
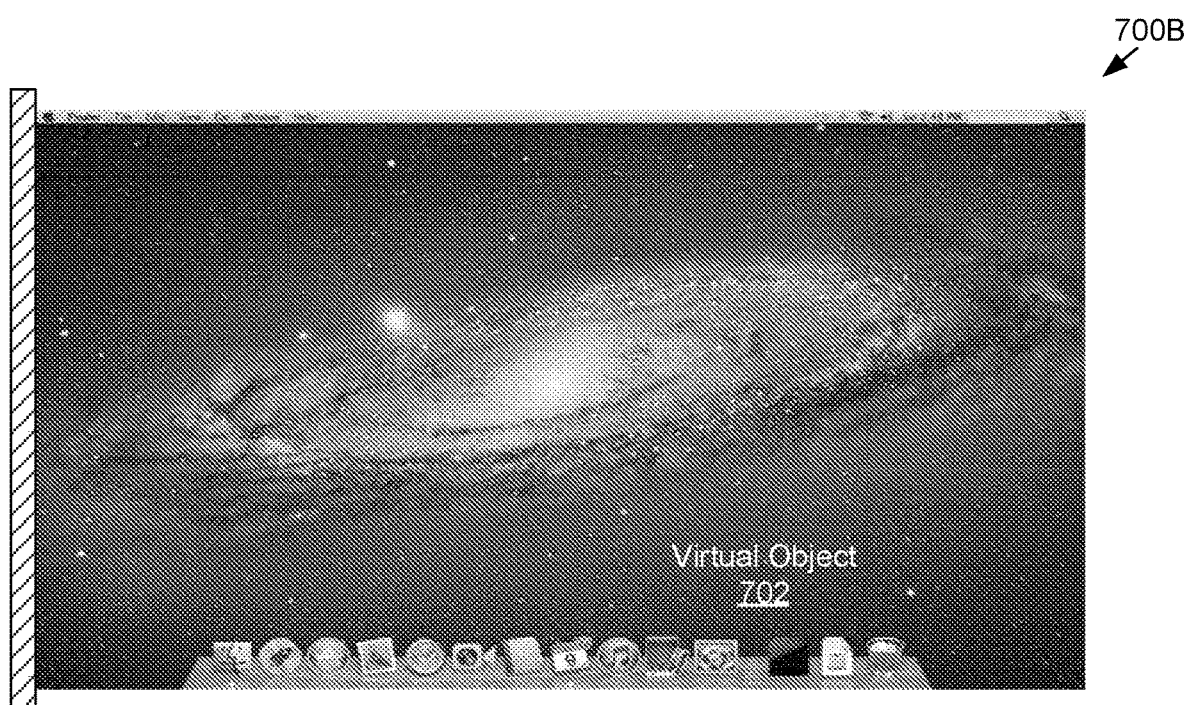
Figure 7C:
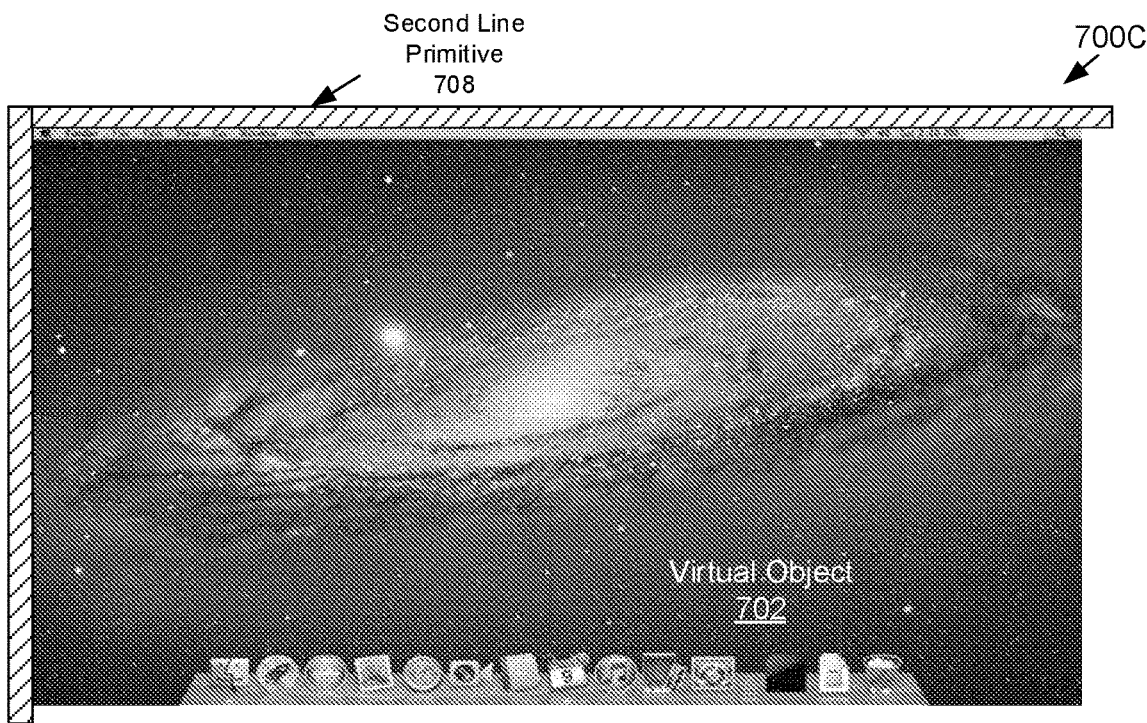
Figure 7D:
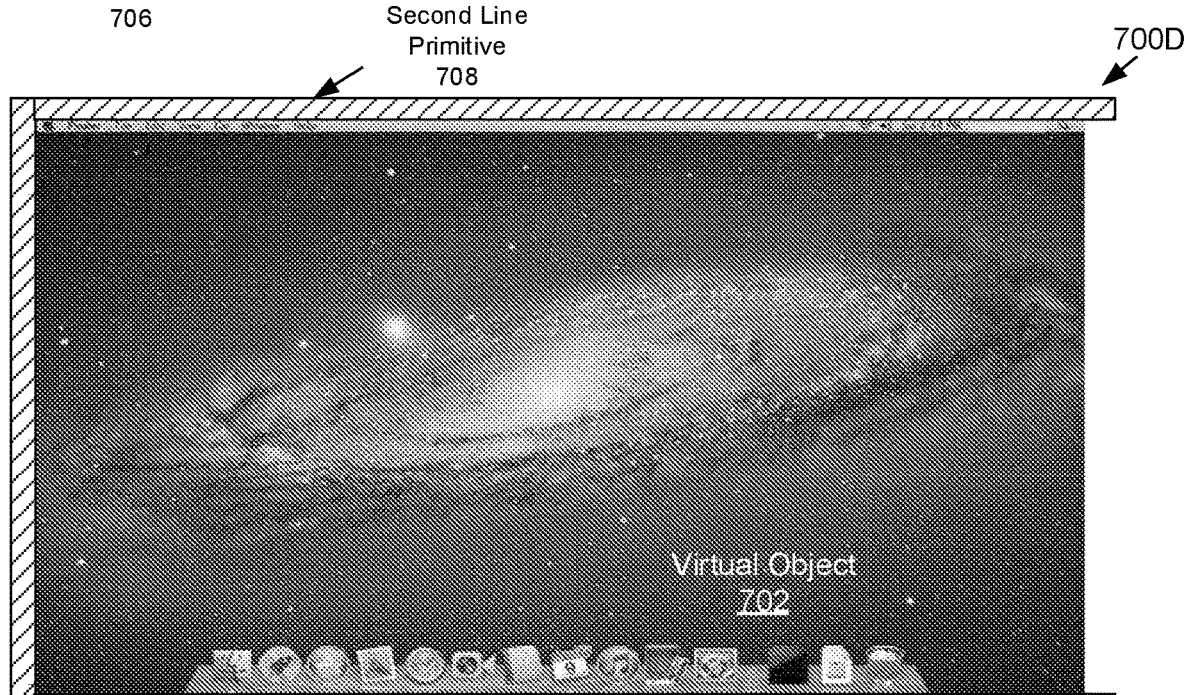
Figure 7E:
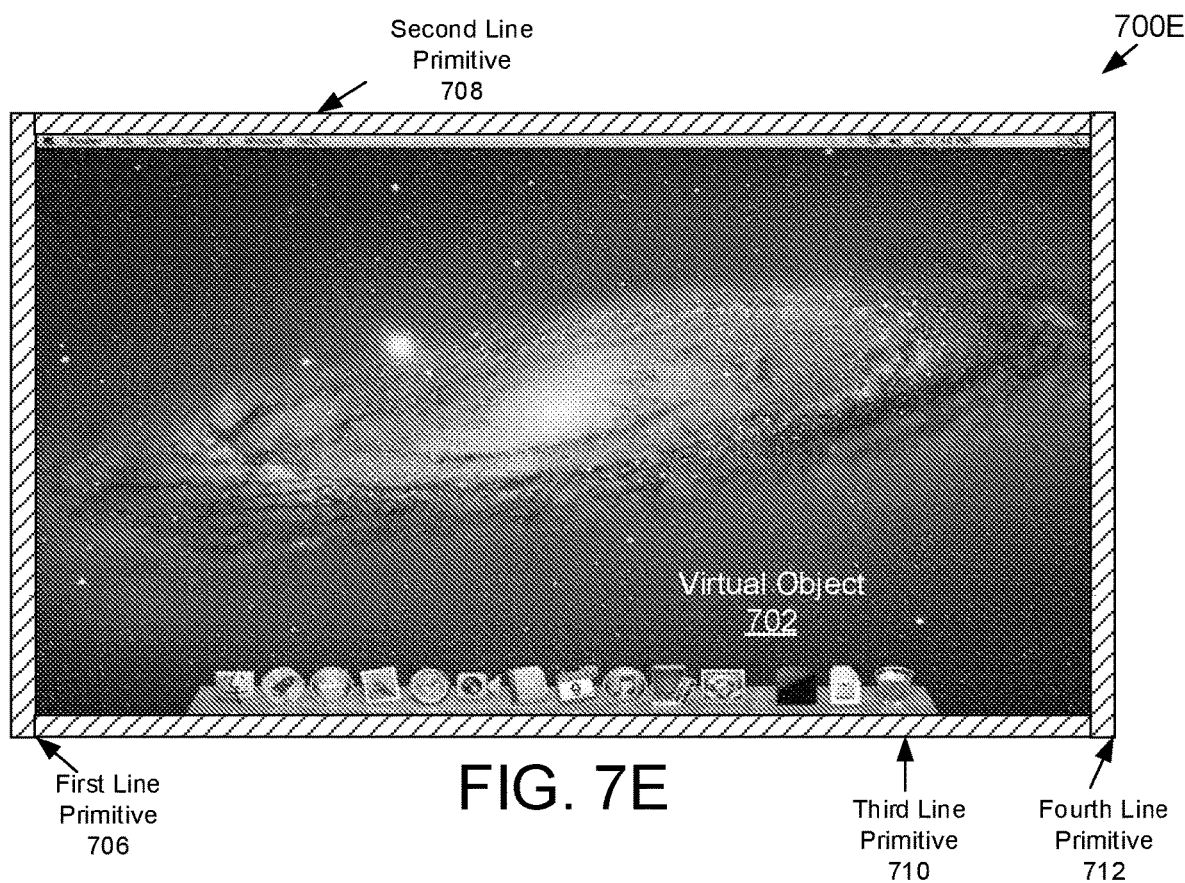

Turning to FIG. 7B, the screen capture 700B includes the virtual object 702 and a first line primitive 706. In some implementations, the virtual frame creation component 130 may gather from the primitive datastore 116 the first line primitive 706. Turning to FIG. 7C, the screen capture 700C includes the virtual object 702, the first line primitive 706, and a second line primitive 708. The screen capture 700D in FIG. 7D further shows the presence of a third line primitive 710, while the screen capture 700E in FIG. 7E further shows the presence of a fourth line primitive 712.

Figure 7F:
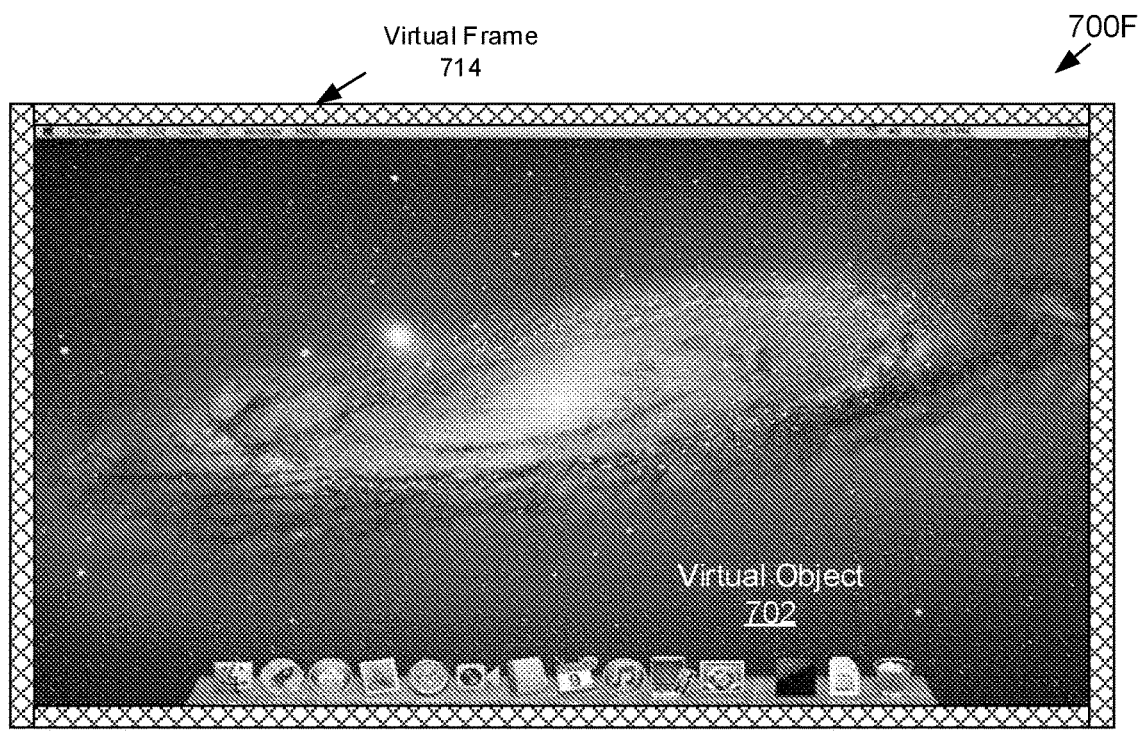

Turning to FIG. 7F, the screen capture 700F shows a virtual frame 714 created around the virtual object 702. The virtual frame 714 may have been created by the virtual frame creation component 130 based on the first line primitive 706, the second line primitive 708, the third line primitive 710, and the fourth line primitive 712. In various implementations, the virtual frame creation component 130 may "lock" the virtual frame 714 to the virtual object 702 in the virtual environment so that the virtual frame 714 and the virtual object 702 move as a rigid body in the virtual environment. Further, in some implementations, the virtual frame creation component 130 may configure the virtual frame 714 and the virtual object 702 to disallow specific types of motion (e.g., specific types of rotations that would detract from the virtual environment user experience) in the virtual environment. In various implementations, the virtual frame creation component 130 may configure properties of the virtual frame 714 to change when a user is within a specified distance of the virtual frame 714. For instance, the virtual frame creation component 130 may configure the virtual frame 714 to "glow" (by, e.g., using the techniques described in U.S. Prov. Pat. App. Ser. No. 62/296,480, entitled, "Virtual Image Interaction Feedback,' filed Feb. 17, 2016) and/or change colors when points of a depth cloud caused by a physical object (a hand, a stylus, another physical object, etc.) are within a specified distance of the virtual frame 714 and/or are applying a virtual force to the virtual frame.

FIGS. 8A, 8B, 8C, 8D and 8E illustrate screen captures 800A, 800B, 800C, 800D and 800E of a virtual environment modeling system used to model user interactions with a virtual frame and a virtual object in a virtual environment, in accordance with some implementations. The screen captures 800A, 800B, 800C, 800D, and 800E illustrate specific types of user interactions that may or may not be facilitated by the virtual frame creation component 130 after the virtual frame 714 has been created for the virtual object 702. It is noted that the virtual frame creation component 130 may facilitate any combination of these user interactions, and need not facilitate some of these user interactions in some implementations. Further, in some implementations, the virtual frame management component 132 may process the user interactions against the virtual frame 714 and the virtual object 702 in the virtual environment, as discussed further herein.

Figure 8A:
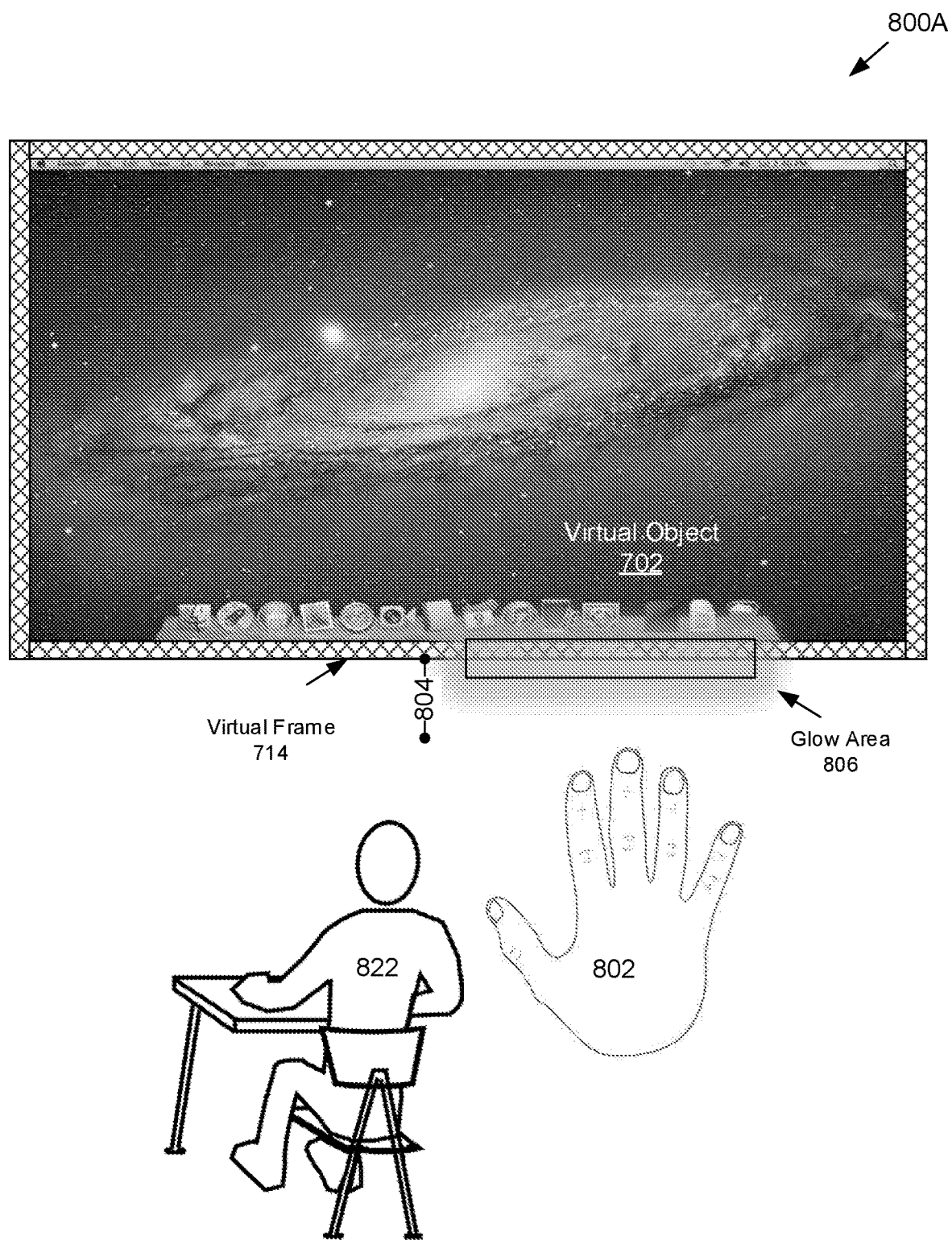
FIGS. 8A, 8B, 8C, 8D, and 8E illustrate screen captures of a virtual environment modeling system used to model user interactions with a virtual frame and a virtual object in a virtual environment, in accordance with some implementations.

Turning to FIG. 8A, the figure shows a screen capture 800A of a virtual environment modeling system used to model user interactions with the virtual frame 714 and the virtual object 702 in a virtual environment, in accordance with some implementations. The screen capture 800A further shows a user interaction element 802, modeled as a hand of a user that is seeking to interact with the virtual object 702. The user interaction element 802 may be associated with a user 822. In this example, the user 822 may be interfacing with a 3D virtual environment displayed on an output device, such as the display(s) 106. The user 822 may be provided with the virtual object 702 in the output device as a part of the 3D virtual environment supported by the output device. As an example, the virtual object 702 may appear to "float" above the user 822 in the 3D virtual environment. The user interaction element 802 may be used to interact with the virtual object 702 in the virtual environment. In this example, the virtual frame 714 has been configured by the virtual frame creation component 130 to "glow" when the user interaction element 802 is within a specified distance 804 of the virtual frame 714. Such a feature is illustrated in FIG. 8A by a glow area 806 on the virtual frame 714 that changes colors when the user interaction element 802 is within the specified distance 804 of the virtual frame 714. The glow area 806 may also cause boundaries and/or other properties of the virtual frame 714 to change when the user interaction element 802 is within the specified distance 804 of the virtual frame 714.

Figure 8B:
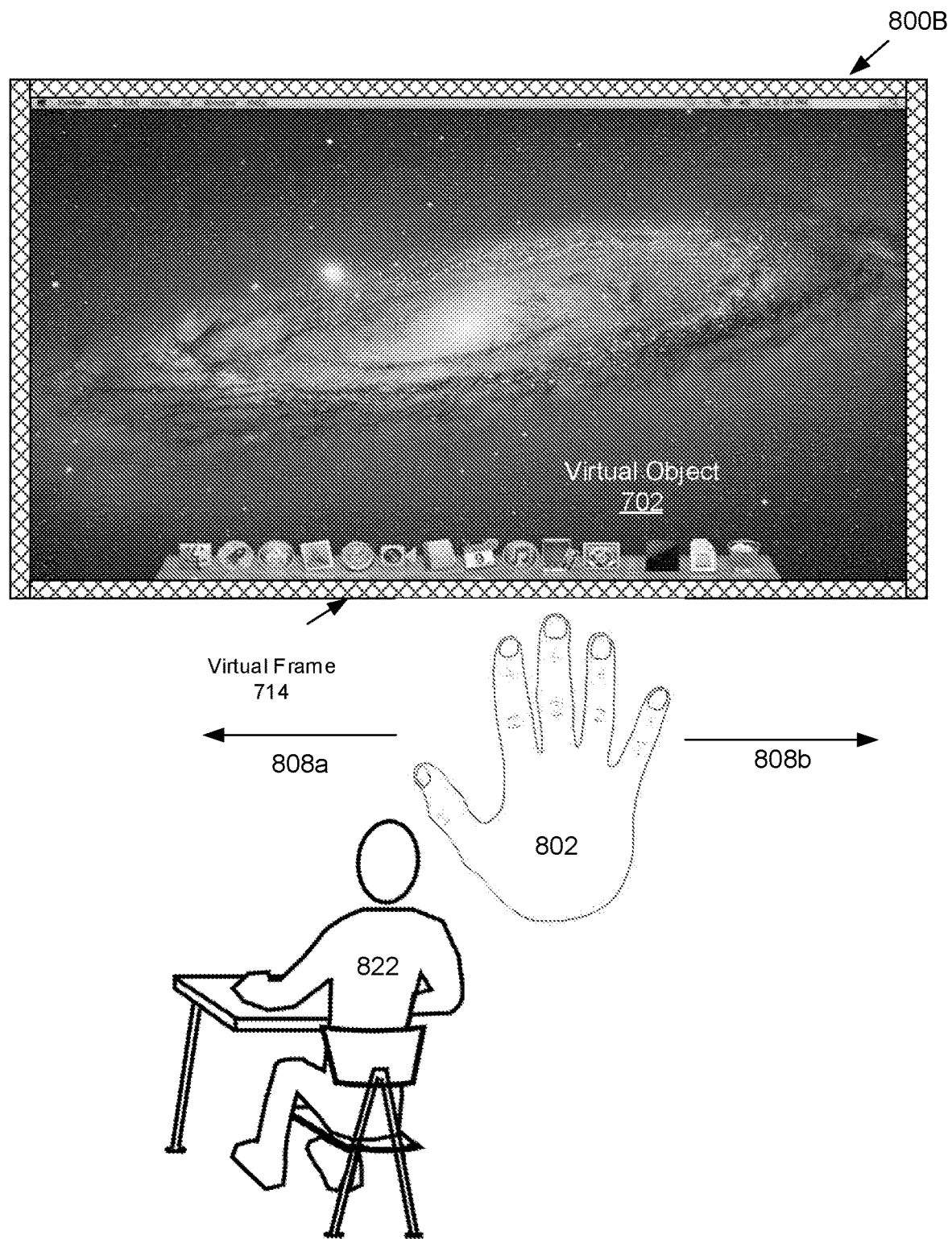

Turning to FIG. 8B, the figure shows a screen capture 800B of a virtual environment modeling system used to model user interactions with the virtual frame 714 and the virtual object 702 in a virtual environment, in accordance with some implementations. In the screen capture 800B, the virtual object 702 has been configured to be locked to the virtual frame 714 by the virtual frame creation component 130. (It is noted in some implementations, the virtual frame 714 may have been configured to be locked to the virtual object 702, etc.) In the example of FIG. 8B, the user interaction element 802 may supply a first swiping motion 808a and/or a second swiping motion 808b to the virtual frame 714. As the virtual frame creation component 130 has locked the virtual frame 714 to the virtual object 702, the virtual object 702 and the virtual frame 714 may move together in response to the first swiping motion 808a and/or the second swiping motion 808b. For instance, the virtual object 702 and the virtual frame 714 may move in a first direction in response to the first swiping motion 808a and in a second direction in response to the second swiping motion 808b.

Figure 8C:
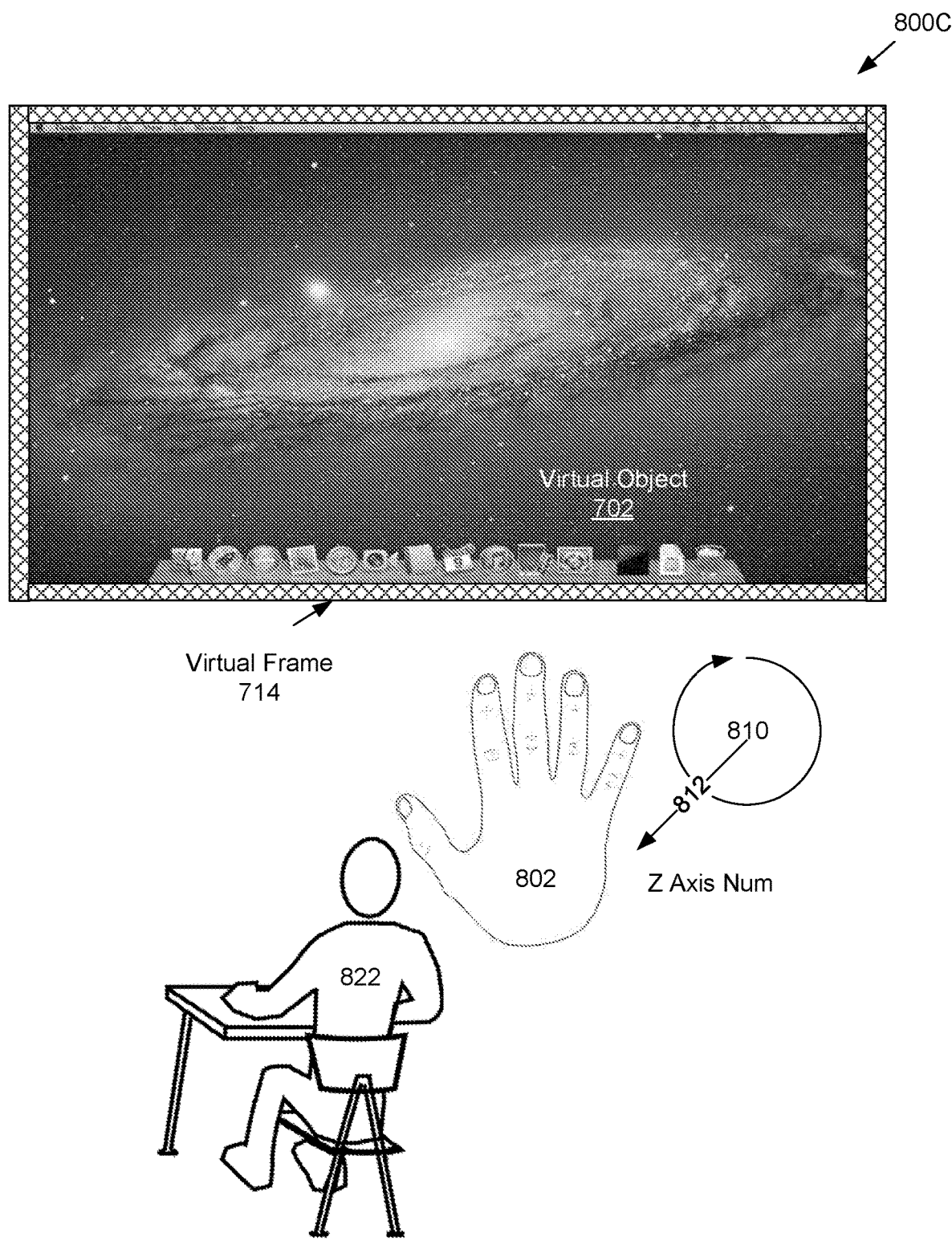

Turning to FIG. 8C, the figure shows a screen capture 800C of a virtual environment modeling system used to model user interactions with the virtual frame 714 and the virtual object 702 in a virtual environment, in accordance with some implementations. In the screen capture 800C, the virtual frame 714 has been configured to be locked to the virtual object 702 by the virtual frame creation component 130. In this example, the user interaction element 802 may supply a first rotating motion 810 about an axis (z axis 812) orthogonal to the plane of the virtual frame 714. The virtual frame creation component 130 may have configured the virtual frame 714 and the virtual object 702 to be rotated about the z axis 812 in accordance with the first rotating motion 810.

Figure 8D:
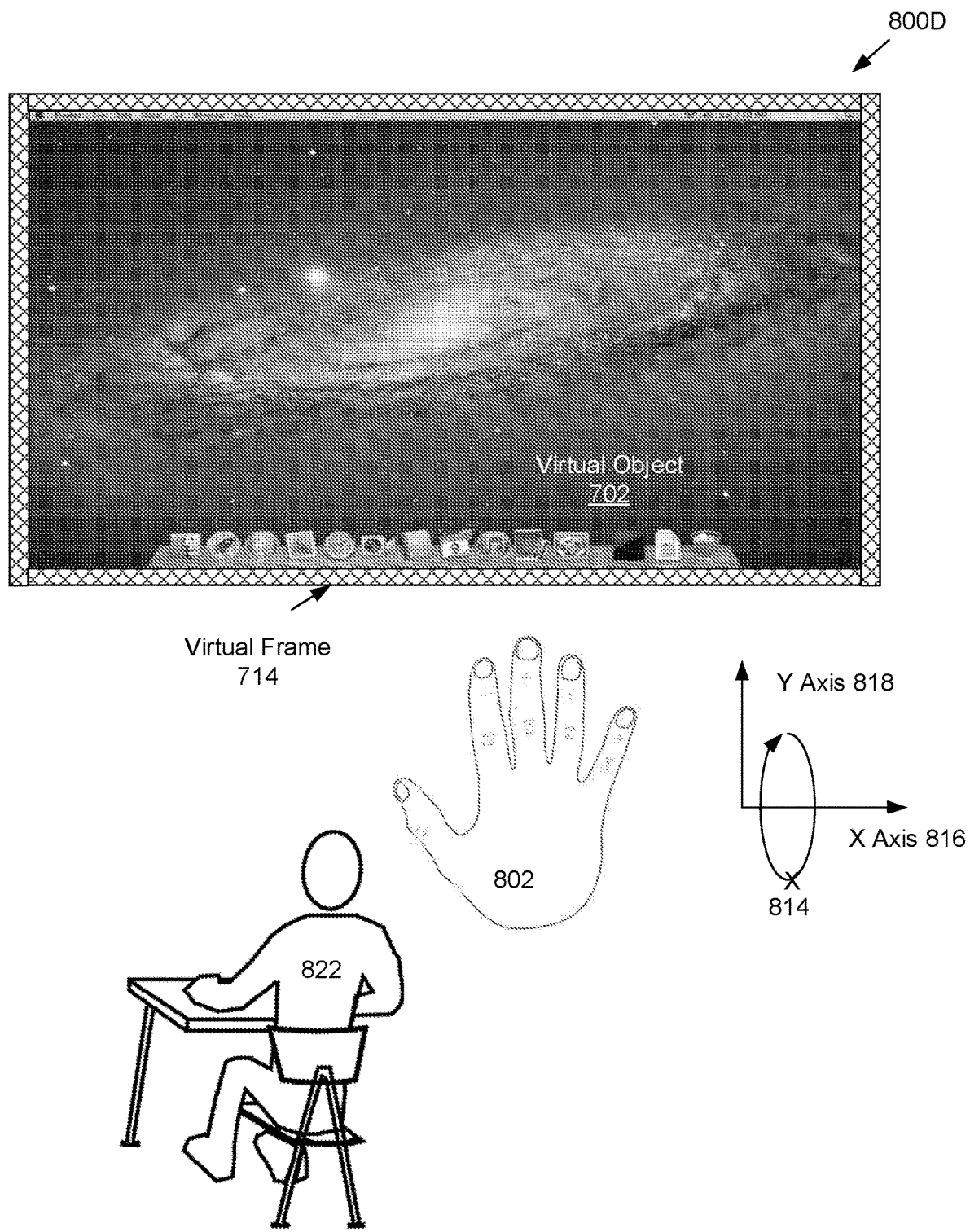

Turning to FIG. 8D, the figure shows a screen capture 800D of a virtual environment modeling system used to model user interactions with the virtual frame 714 and the virtual object 702 in a virtual environment, in accordance with some implementations. In the screen capture 800D, the virtual frame has been configured to be locked to the virtual object 702 by the virtual frame creation component 130. In this example, the user interaction element 802 may attempt to supply a second rotating motion 814 about an axis (x axis 816) that resides within the plane of the virtual frame 714. In this example, the virtual frame creation component 130 may have configured the virtual frame 714 and the virtual object 702 to resist rotations around the x axis 816. In some implementations, the virtual frame creation component 130 may limit any rotation about the x axis 816, while in other implementations, the virtual frame creation component 130 may allow rotations only to a specified angle, and may cause the virtual frame 714 and the virtual object 702 to return to their original orientation after the specified angle has been reached.

Figure 8E:
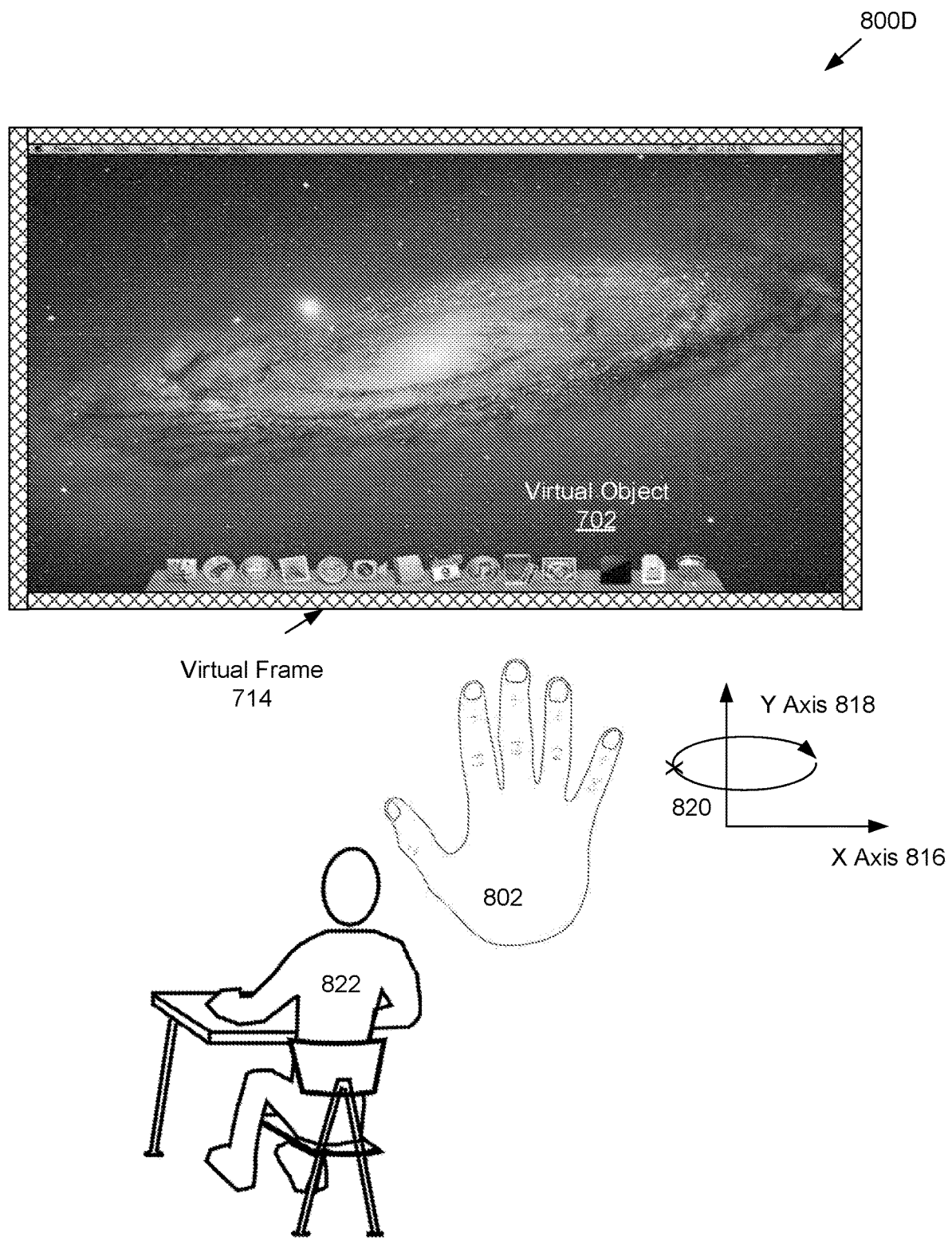

Turning to FIG. 8E, the figure shows a screen capture 800E of a virtual environment modeling system used to model user interactions with the virtual frame 714 and the virtual object 702 in a virtual environment, in accordance with some implementations. In the screen capture 800E, the virtual frame creation component 130 has blocked a rotation motion 820 around another axis (y axis 818) that resides within the plane of the virtual frame 714.

Virtual Frame Management Component 132

Returning to FIG. 1, the virtual frame management component 132 may include computer-readable instructions to manage virtual frames that have been created by the virtual frame creation component 130. In various implementations, the virtual frame management component 132 processes instructions to move (translate, rotate, etc.) a virtual frame locked to a virtual object. The virtual frame management component 132 may provide the display management component 122 with instructions to modify display of a locked virtual frame/virtual object.

Virtual Object Datastore 114, Primitive Datastore 116, Shape Boundary Datastore 118, and User Interaction Datastore 120

The virtual object datastore 114, the primitive datastore 116, the shape boundary datastore 118, and the user interaction datastore 120 may comprise electronic storage media that electronically stores information. The electronic storage media may include one or both of system storage that is provided integrally (i.e., substantially non-removable) with virtual environment management system 100 and/or removable storage that is removably connectable to the virtual environment management system 100 via, for example, a port (e.g., a USB port, a firewire port, etc.) or a drive (e.g., a disk drive, etc.). The virtual object datastore 114, the primitive datastore 116, the shape boundary datastore 118, and the user interaction datastore 120 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage media may include one or more virtual storage resources (e.g., cloud storage, a virtual private network, and/or other virtual storage resources). The electronic storage media may store software algorithms, information determined by processor(s) 110, information received from the virtual environment management system 100, and/or other information that enables the virtual environment management system 100 to function as described herein.

In an implementation, the virtual object datastore 114 is configured to store virtual objects. The primitive datastore 116 may be configured to store primitives. The shape boundary datastore 118 may be configured to store shape boundaries used as the basis of virtual frames. In some implementations, the shape boundary datastore 118 may store polygons used as the basis of virtual frames. In some implementations, the shape boundary datastore 118 may store information for identifying a boundary region of a virtual object based on a mesh, etc. that is associated with, or implicit in, the virtual object. The user interaction datastore 120 may be configured to store user interaction methods, pre-programmed gestures and/or data.

Flowcharts of Example Methods of Operation

Flowcharts of example methods of operation of the virtual environment management system 100 shown in FIG. 1 and further discussed in the context of FIGS. 1-8E are now presented herein. The operations of the methods of operation presented below are intended to be illustrative. In some implementations, methods may be accomplished with one or more additional operations not described, and/or without one or more of the operations discussed. Additionally, the order in which the operations of methods are illustrated in the figures and described below is not intended to be limiting.

Process 900 for Interacting with Virtual Objects in a Virtual Environment

Figure 9:
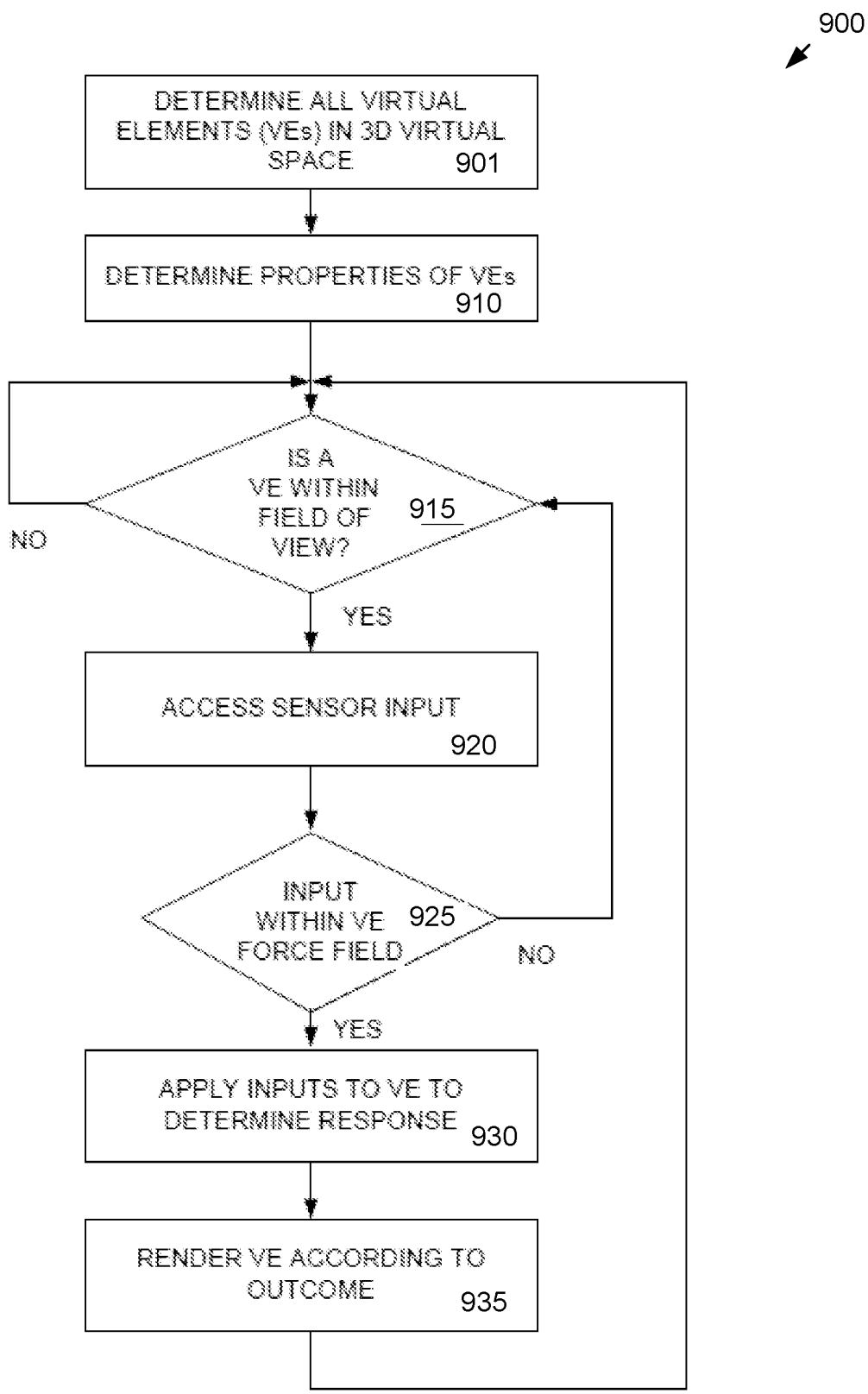
FIG. 9 is a flowchart showing an example of a process for interacting with virtual objects in a virtual environment, in accordance with one or more implementations.

FIG. 9 is a flowchart showing an example of a process 900 for interacting with virtual objects in a virtual environment, in accordance with one or more implementations. The process 900 may be implemented by one or more of the modules of the virtual frame creation component 130 and/or other modules discussed herein. At an operation 901, all of the virtual elements in the 3D virtual space may be determined. For example, one or more files corresponding to the virtual 3D space may be accessed from a memory device. The virtual elements may be mapped to initial coordinates within the 3D virtual space.

At an operation 910, the properties of all the virtual elements determined to be in the virtual 3D space may be accessed from a corresponding file in a memory device. For example, the primitives and their corresponding parameters may be accessed, such as an interaction volume (e.g., charge and one or more field boundaries).

At an operation 915, it may be determined whether a virtual element may be in a field of view of a sensor. For example, a sensor detecting real world objects may be oriented to coincide with the field of view of a user of a head mounted display (HMD). As the camera may be pointed in a direction corresponding to the movement of the head of user, the view in the virtual 3D space may be mapped to coincide with the movement of the sensor and head. Scanning continues with movement of the user's and/or camera's field of view.

When one or more virtual elements may be detected, any sensor input corresponding to the field of view may be accessed, in operation 920. For example, frames of input from a depth sensor may be accessed and inputs of real world elements mapped to the virtual 3D space. In one example, a hand of user may be detected and mapped or translated to coordinates in the virtual 3D space.

At an operation 925, for any sensor input, it may be determined whether any of the sensor input may be within an interaction volume of a virtual element. For example, a shortest distance calculation as explained above in association with FIG. 2 may be performed to determine whether a coordinate in the virtual space corresponding to a sensor input may be within boundary of a virtual element as defined by the interaction volume parameter. A spatial partitioning method (i.e., a process of dividing space into indexed and searchable regions) may be applied to speed up the boundary-checking process, and may reduce the computation overhead on the distance calculation. If no sensor input may be detected within the interaction volume of a virtual element, the process returns to operation 915.

At an operation 930, for a virtual element having its interaction volume penetrated by a sensor input, the sensor inputs may be applied to the virtual element to determine how the virtual element responds. For example, a force may be determined and applied to the virtual element to determine a response of the virtual element to the applied force.

At an operation 935, the virtual elements may be rendered according to the outcome of the response determined in operation 930, and the process returns to operation 915. For example, the orientation of a virtual element may be rotated around a center of mass associated with the virtual element in response to sensor input corresponding to the user's hand "pushing" on a portion of the virtual element to rotate it (e.g., as shown in FIGS. 6A and 6B).

Process 1000 for Application of Sensor Inputs to Virtual Objects

Figure 10:
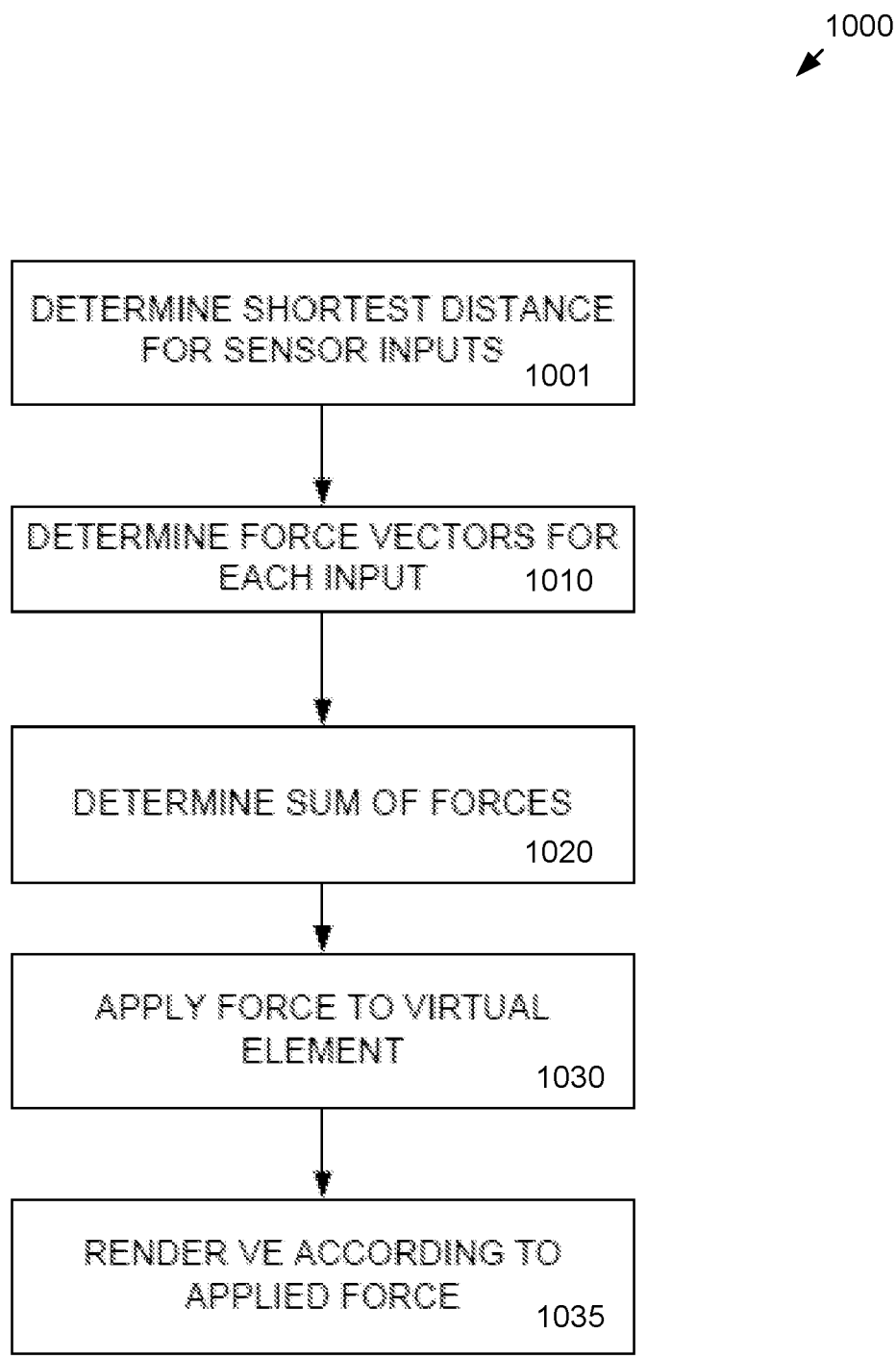
FIG. 10 is a flowchart showing an example of a process for application of sensor inputs to a virtual component in a virtual environment, in accordance with one or more implementations.

FIG. 10 is a flowchart showing an example of a process 1000 for application of sensor inputs to a virtual component in a virtual environment, in accordance with one or more implementations. In an example, the process 1000 is implemented as part of operation 930 in the process 900 shown in FIG. 9.

At an operation 1001, the shortest distance ds to a virtual element for a sensor input may be determined. For example, the length of a straight line segment orthogonal to a point on the core extending from the point on the core to the coordinates of a point pi (e.g., associated with an input from a sensor) may be determined.

At an operation 1010, a force vector for a sensor input may be determined. For example, the charge and magnitude of the interaction volume may be determined (e.g., q1) and the charge and magnitude of the input from the sensor may be determined (e.g., qi) and the force may be calculated as:

$$F_1 = k_e \frac{q_1 q_i}{|r_{i1}|^2} d_s^{i1} \qquad \text{Equation 6}$$

At an operation 1020, the forces for all vectors of points within the interaction volume of the virtual element may be summed to determine the total force exerted on the element. For example, the total force exerted on the element can be calculated through the use of the equation: F_f=Sum(F_i)

At an operation 1030, the sum of the forces may be applied to the virtual element and an outcome may be determined based on the result of that application. For example, the calculated force for a vector and the parameters of the primitive (e.g., a constraint such as mass and center of mass) may be put into to a physics engine or other logic that defines the nature of a manipulation of virtual elements in the virtual 3D space. In one implementation, the physics engine may be a process or application including a collection of equations simulating real world physics and the application of forces. For example, given the force, mass, and center of mass of the virtual element, the physics engine determines a direction and distance travelled in the virtual space from the application of the force, such as determining the linear and angular momentum of a primitive by determining the position and velocity of the primitive relative to the coordinate for the primitive's center of mass.

At an operation 1035, the outcome may be rendered and acted upon. For example, the output from the physics engine describing a direction of movement, an end move coordinate and an orientation may be provided to processor for translation to a graphics rendering of the virtual element in space over time. For example, an application of force to a virtual element may move the virtual element in the virtual 3D space from a first coordinate to a second coordinate along a line and distance determined by the engine. In another example, a force may be applied to a virtual button or touch panel. The movement of the button along a direction of constraint may cause the button to be rendered as depressed and an input corresponding to depressing the button may be activated (e.g., hitting an enter button on a virtual keypad).

Process 1100 for Interacting with Virtual Elements

Figure 11:
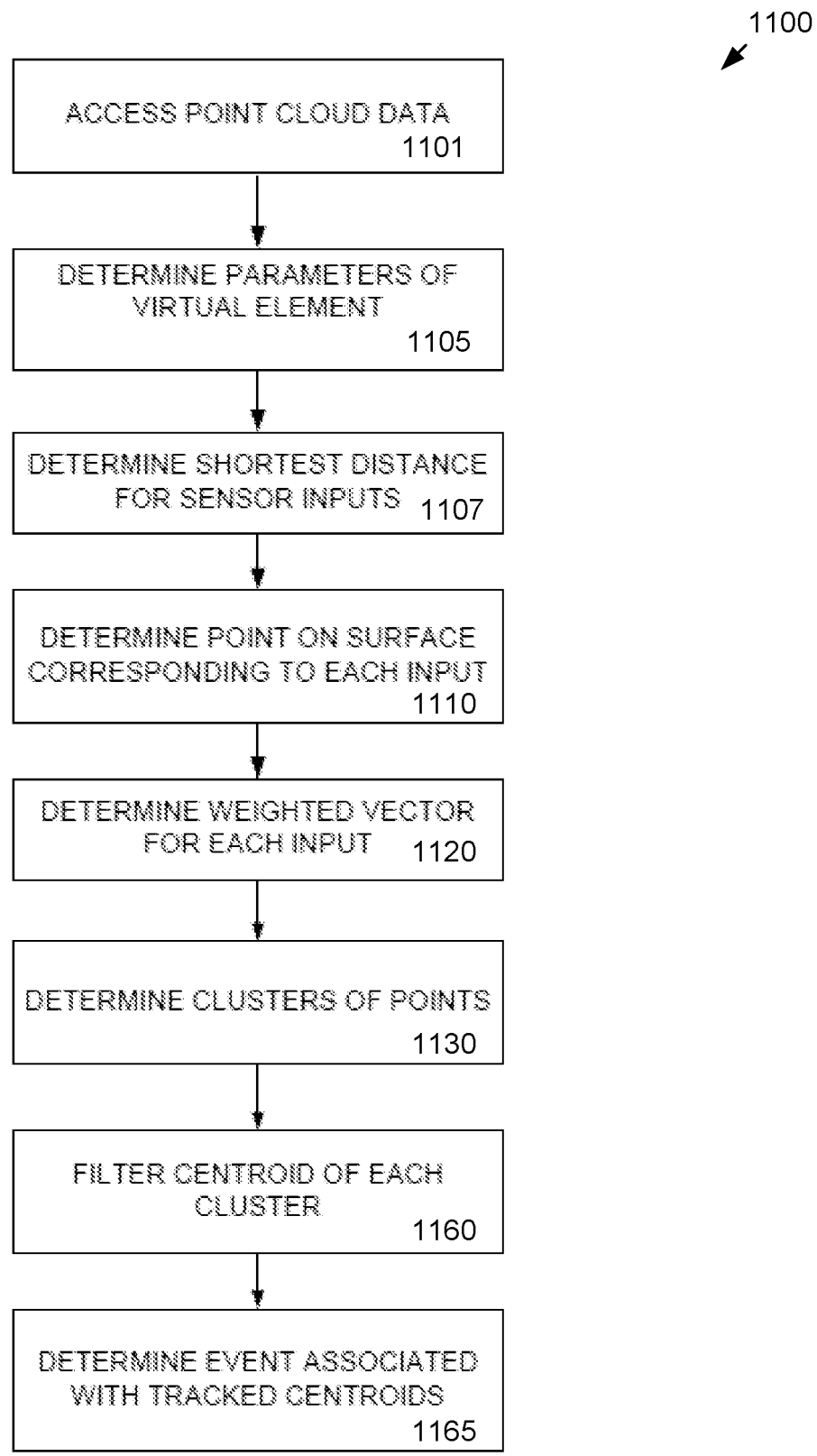
FIG. 11 is a flowchart showing an example of a process for interacting with a virtual object in a virtual environment, in accordance with one or more implementations.

FIG. 11 is a flowchart showing an example of a process 1100 for interacting with a virtual component in a virtual environment, in accordance with one or more implementations. The process 1100 may be implemented by one or more of the modules of the virtual frame creation component 130 and/or other modules discussed herein.

At an operation 1101, a point cloud from a sensor may be received or accessed. A point of the cloud may correspond to a sensor output. For example, for one frame of the output from a depth camera, the location of all points within a 3D virtual space corresponding to a sensor input for the frame may be determined.

At an operation 1105, the parameters of a virtual element may be determined. For example, the primitive type, the position of the primitive within the 3D virtual space, and the interaction volume parameters may be determined for the virtual element. In this example, a plane primitive may be used to simulate the surface of a touch panel interface (the "panel") having an interaction volume parameter with a charge of zero from 0 cm to 5 cm from the core plane of the primitive.

At an operation 1107, the shortest distance from the points of the cloud to the panel may be calculated. For example, a line orthogonal to the surface of the primitive and intersecting a point of the cloud may be determined for points of the cloud.

At an operation 1110, points of the cloud within the interaction volume boundary may be back-projected onto the surface of the virtual element. For example, all points of the cloud having a shortest distance that may be less than the distance of the interaction volume parameter may be determined. All points determined to be within the interaction volume of the virtual element may be back-projected on the surface of the primitive at the point located where one or more orthogonal lines corresponding to the shortest distance to a sensor input intersects the surface of the primitive of the virtual element.

At an operation 1120, a weighted vector (e.g., (x, y, w) where x, y may be the coordinates of the vector and w may be the weight of the interaction with the primitive) may be determined for back-projected point(s). For example, a weight w for sensor input i may be determined as $w_i=f(c)*g(d_i)$ where c may be a confidence value of the point cloud data and d may be the distance of the input i from the primitive, and f(x) and g(x) may be penalty functions for the parameters c and d. In this example, w implements a noise filter and penalty functions to decrease the significance of the weight of an input when the $_{25}$ data may be noisy. In one example, a penalty function observes the distribution of the points (i.e., the variance) of the point of cloud to adjust the w (e.g., when the points of the cloud may be clustered tightly the variance may be considered to be lower confidence may be higher, and when the points may be distributed variance may be greater and confidence may be lower).

At an operation 1130, "clusters"—a group of points that may be contained within a fixed boundary—may be determined and tracked from the back-projected points. When a group of back-projected points may be clustered on surface of a primitive modeling a virtual element that resembles and functions as a multi-touch panel, it may indicate that a user may be interacting with the surface of the panel (e.g., entering an input of a button or adjusting the presentation of content, such as pinch to zoom). In this example, a clustering algorithm may be applied to all the back-projected points to determine clusters or groups of related points and track them (e.g., to determine an event related thereto such as a scroll event). To do this, first, a cluster list may be created. For the first frame of sensor data received, the cluster list does not contain any clusters, as the clusters have not yet been calculated from the back-projected points. The back projected points determined from the first frame may be then clustered.

In one example of the clustering process, a bounding box of a predetermined size may be used (e.g., a 3×3 cm box) to determine a cluster. The primitive surface may be first scanned for back-projection points. When a back-projection point of the back-projected image may be detected, it may be determined whether the point falls into the bounding box of a previously-identified cluster. If no previously-identified cluster exists around the point, a new cluster may be created, a unique ID may be assigned to the cluster, the point may be added to the cluster, and the ID may be added to the list. For new cluster(s), it may be determined if any additional points may be within the bounding box around the point.

For additional point(s) within the box, the point may be added to the cluster ID. The scan continues until all points may be assigned to a cluster ID. The clusters may be then filtered to remove clusters that may be associated with noise. For example, any cluster having too few back projection points may be removed and its ID may be deleted from the cluster list.

A centroid (e.g., the arithmetic mean ("average") position of all the points in the cluster) may be 20 determined for cluster ID(s) and the position of the centroid may be stored with the cluster ID. The centroid may be considered the location of the cluster on the panel virtual element.

The cluster list with the IDs and location of cluster(s) may be matched against the cluster list derived from the last input frame to determine whether any cluster corresponds to a previous cluster. For example, if the distance between the locations of two clusters may be less than the size of the cluster bounding box, the clusters may be considered matching clusters. In this case, the ID of the current cluster may be removed from the list, and the position of the centroid of the current cluster (e.g., the location on the panel) of the cluster position may be added to the ID for the previous matching cluster. For any cluster not matching a previous cluster, the unique ID may be preserved in the list. In this manner, the movement of a cluster may be traced from one sensor input frame to the next.

At an operation 1160, the location saved for cluster(s) of an ID in the list may be filtered. For example, a motion filter, for example, such as Kalman filter or the like may be applied to tracked location(s) associated with an ID to reduce effects such as jitter. The filtered location may be then saved to the cluster list.

At an operation 1165, it may be determined whether an event associated with the centroids stored in the cluster may be triggered. For example, in an implementation of multi-touch panel virtual element, the position of one or more tracked centroids may indicate a trigger event, such as a swipe, a tap, or a multi-finger gestures (e.g., a pinch to zoom event). For example, movement of a cluster along a line for a predetermined distance in the same direction may indicate that a scroll up event has been triggered causing the content presented in association with the virtual panel to scroll up.

In various implementations, operations 1101-1165 are repeated for frame(s) input from the sensor. The operations 1101-1165 may allow a virtual component in a virtual environment to be interacted with.

Figure 12A:
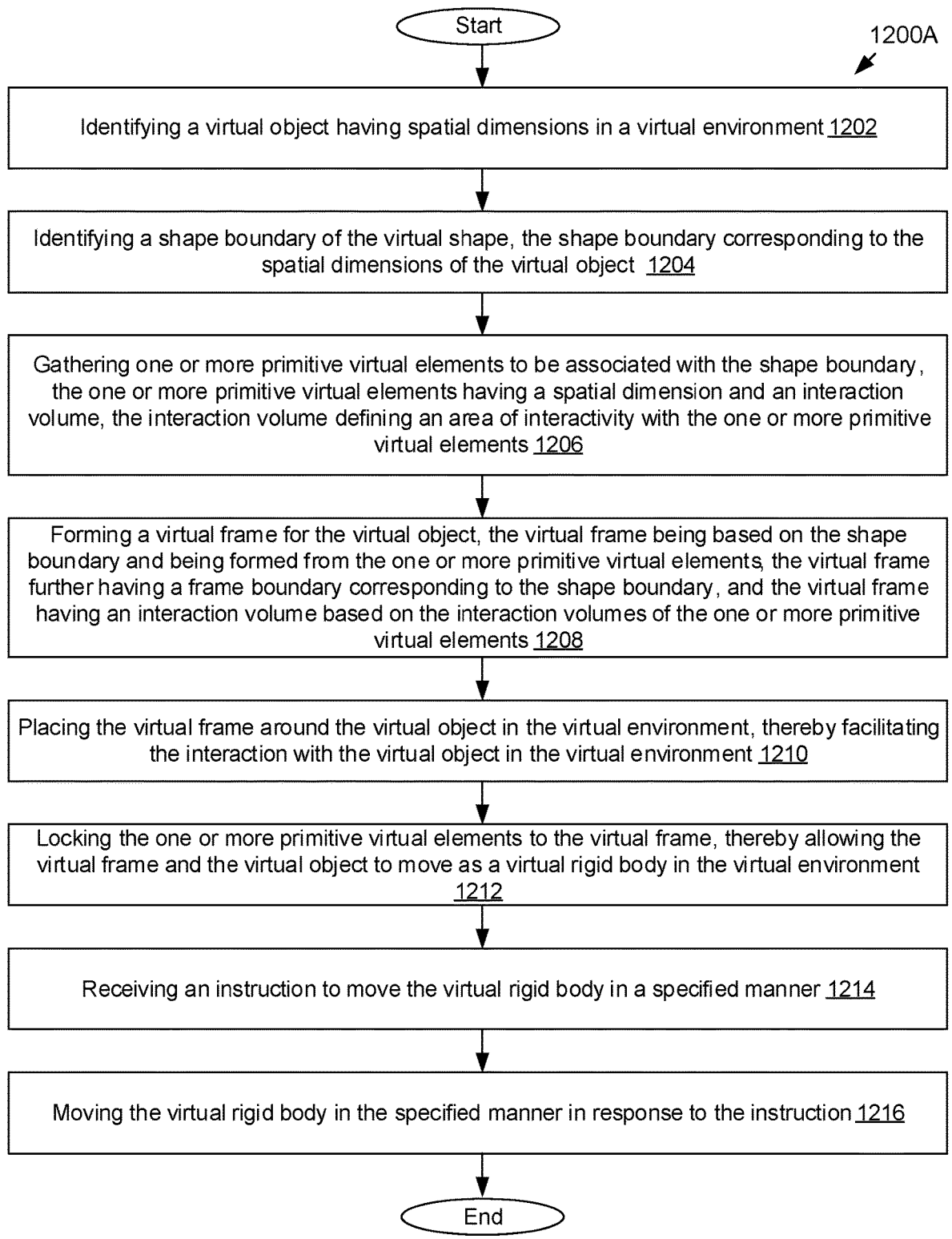
FIG. 12A is a flowchart showing an example of a process for interacting with a virtual rigid body comprising a virtual frame and a virtual object, in accordance with one or more implementations.

Processes 1200A and 1200B for Interacting with a Virtual Rigid Body Comprising a Virtual Frame and a Virtual Object FIG. 12A is a flowchart showing an example of a process 1200A for interacting with a virtual rigid body comprising a virtual frame and a virtual object, in accordance with one or more implementations. The process 1200A may be implemented by one or more of the modules of the virtual frame creation component 130 and/or other modules discussed herein.

At an operation 1202, a virtual object having spatial dimensions in a virtual environment may be identified. In VR implementations, the virtual object may comprise any item in a virtual environment. In AR implementations, the virtual object may comprise any item in a virtual environment, including items that correspond to virtual representations of physical objects in the physical world.

At an operation 1204, a shape boundary of the virtual shape may be identified. The shape boundary may correspond to spatial dimensions of the virtual object. In some implementations, the shape boundary may be based, at least in part on a mesh, etc. of the virtual object. In some implementations, a polygon having a shape corresponding to the spatial dimensions of the virtual object, and having a shape boundary based on the shape may be identified. The polygon may comprise a shape having at least two sides of equal length, including but not limited to shapes equilateral shapes, shapes where opposing sides of equal length (rectangles, etc.), etc. In some implementations, the polygon comprises a shape where at least two sides are of different length. In some implementations, a boundary region of the virtual object may be identified using properties of the virtual object, such as a mesh or other boundary contours of the virtual object, a virtual position of the virtual object in the virtual environment, one or more axes associated with the virtual object in the virtual environment, etc.

At an operation 1206, one or more primitive virtual elements to form the shape boundary in the virtual environment may be gathered. In various implementations, the one or more primitive virtual elements may have a spatial dimension and an interaction volume, where the interaction volume defines an area of interactivity with the of the one or more primitive virtual elements. The primitive virtual element may comprise a line primitive in various implementations. Other primitive shapes are possible without departing from the scope and substance of the inventive concepts described herein.

At an operation 1208, a virtual frame may be formed for the virtual object. The virtual frame may be based on the shape boundary and being formed from the one or more primitive virtual elements. The virtual frame may have a frame boundary corresponding to the shape boundary. The virtual frame may have an interaction volume based on the interaction volumes of the one or more primitive virtual elements. The interaction volume of the virtual frame may allow user interaction with the virtual frame in the virtual environment.

At an operation 1210, the virtual frame may be placed around the virtual object in the virtual environment. The placement of the virtual frame around the virtual object may allow the virtual frame and the virtual object to move as a rigid body in the virtual environment. More specifically, placing the virtual frame around the virtual object may allow the virtual frame and the virtual object to be translated, rotated, etc. within the virtual environment in accordance with any parameters associated with the virtual frame and in response to user instructions to do so.

At an operation 1212, the one or more primitive elements may be locked to the virtual frame. This locking may allow the virtual frame and the virtual object to move as a virtual rigid body in the virtual environment.

At an operation 1214, an instruction to move the virtual rigid body in a specified manner may be received. In an implementation, the instruction may comprise a request to translate the virtual rigid body (e.g., to move the virtual object from a first virtual point in the virtual environment to a second virtual point in the virtual environment). The instruction may, in some implementations, comprise a request to rotate the virtual rigid body about an axis orthogonal to a plane containing the virtual rigid body. At an operation 1216, the virtual rigid body may be moved in the specified manner in response to the instruction.

Figure 12B:
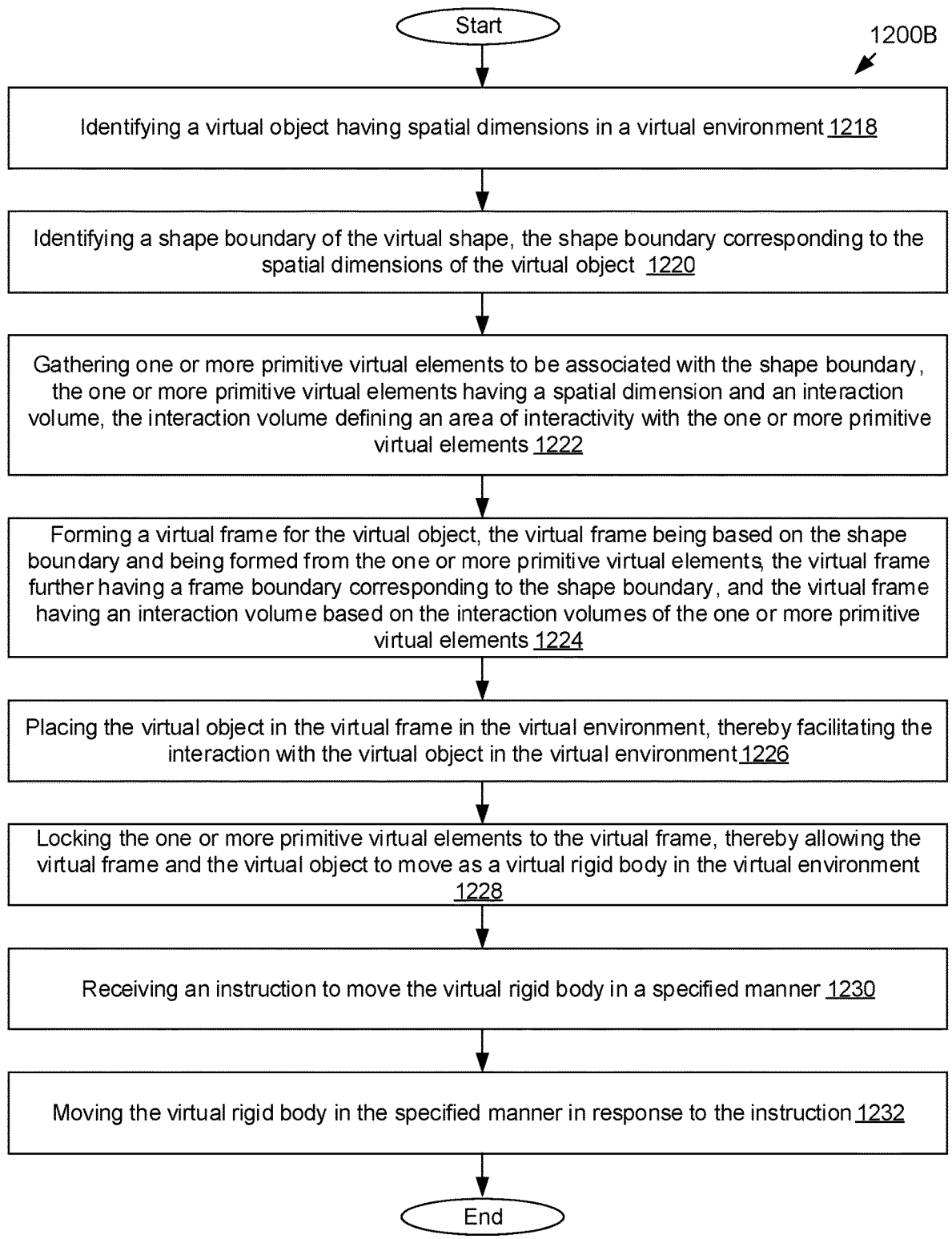
FIG. 12B is a flowchart showing an example of a process for interacting with a virtual rigid body comprising a virtual frame and a virtual object, in accordance with one or more implementations.

FIG. 12B is a flowchart showing an example of a process 1200B for interacting with a virtual rigid body comprising a virtual frame and a virtual object, in accordance with one or more implementations. The process 1200B may be implemented by one or more of the modules of the virtual frame creation component 130 and/or other modules discussed herein.

At an operation 1218, a virtual object having spatial dimensions in a virtual environment may be identified. In VR implementations, the virtual object may comprise any item in a virtual environment. In AR implementations, the virtual object may comprise any item in a virtual environment, including items that correspond to virtual representations of physical objects in the physical world.

At an operation 1220, a shape boundary of the virtual shape may be identified. The shape boundary may correspond to spatial dimensions of the virtual object. In some implementations, the shape boundary may be based, at least in part on a mesh, etc. of the virtual object. In some implementations, a polygon having a shape corresponding to the spatial dimensions of the virtual object, and having a shape boundary based on the shape may be identified. The polygon may comprise a shape having at least two sides of equal length, including but not limited to shapes equilateral shapes, shapes where opposing sides of equal length (rectangles, etc.), etc. In some implementations, the polygon comprises a shape where at least two sides are of different length. In some implementations, a boundary region of the virtual object may be identified using properties of the virtual object, such as a mesh or other boundary contours of the virtual object, a virtual position of the virtual object in the virtual environment, one or more axes associated with the virtual object in the virtual environment, etc.

At an operation 1222, one or more primitive virtual elements to form the shape boundary in the virtual environment may be gathered. In various implementations, the one or more primitive virtual elements may have a spatial dimension and an interaction volume, where the interaction volume defines an area of interactivity with the of the one or more primitive virtual elements. The primitive virtual element may comprise a line primitive in various implementations. Other primitive shapes are possible without departing from the scope and substance of the inventive concepts described herein.

At an operation 1224, a virtual frame may be formed for the virtual object. The virtual frame may be based on the shape boundary and being formed from the one or more primitive virtual elements. The virtual frame may have a frame boundary corresponding to the shape boundary. The virtual frame may have an interaction volume based on the interaction volumes of the one or more primitive virtual elements. The interaction volume of the virtual frame may allow user interaction with the virtual frame in the virtual environment.

At an operation 1226, the virtual object may be placed in the virtual frame in the virtual frame. The placement of the virtual object in the virtual frame may allow the virtual frame and the virtual object to move as a rigid body in the virtual environment. More specifically, placing the virtual object in the virtual frame may allow the virtual frame and the virtual object to be translated, rotated, etc. within the virtual environment in accordance with any parameters associated with the virtual frame and in response to user instructions to do so.

At an operation 1228, the one or more primitive elements may be locked to the virtual frame. This locking may allow the virtual frame and the virtual object to move as a virtual rigid body in the virtual environment.

At an operation 1230, an instruction to move the virtual rigid body in a specified manner may be received. In an implementation, the instruction may comprise a request to translate the virtual rigid body (e.g., to move the virtual object from a first virtual point in the virtual environment to a second virtual point in the virtual environment). The instruction may, in some implementations, comprise a request to rotate the virtual rigid body about an axis orthogonal to a plane containing the virtual rigid body. At an operation 1232, the virtual rigid body may be moved in the specified manner in response to the instruction.

Figure 13A:
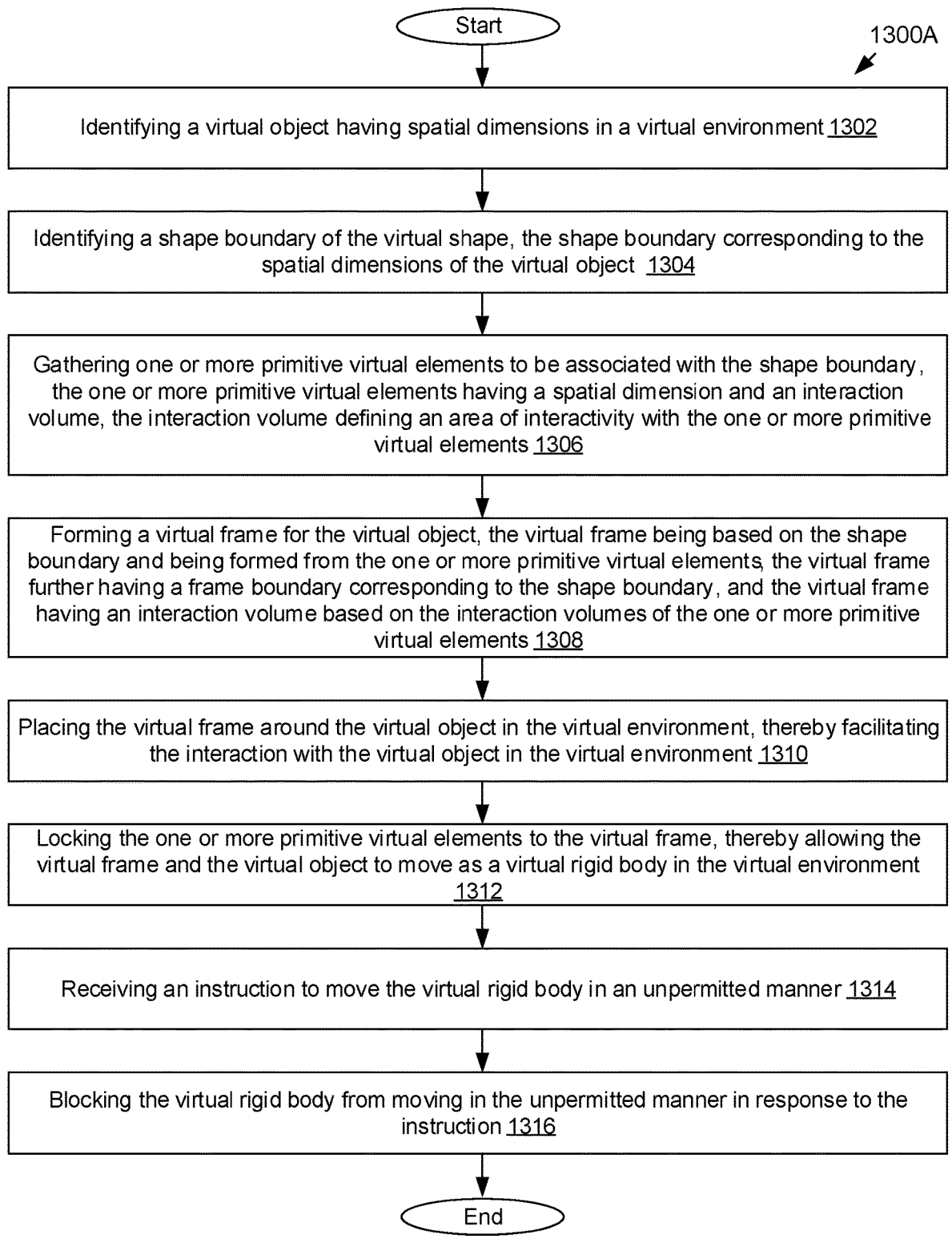
FIG. 13A is a flowchart showing an example of a process for interacting with a virtual rigid body comprising a virtual frame and a virtual object, in accordance with one or more implementations.

Processes 1300A and 1300B for Interacting with a Virtual Rigid Body Comprising a Virtual Frame and a Virtual Object FIG. 13A is a flowchart showing an example of a process 1300A for interacting with a virtual rigid body comprising a virtual frame and a virtual object, in accordance with one or more implementations. The process 1300A may be implemented by one or more of the modules of the virtual frame creation component 130 and/or other modules discussed herein.

At an operation 1302, a virtual object having spatial dimensions in a virtual environment may be identified. In VR implementations, the virtual object may comprise any item in a virtual environment. In AR implementations, the virtual object may comprise any item in a virtual environment, including items that correspond to virtual representations of physical objects in the physical world.

At an operation 1304, a shape boundary of the virtual shape may be identified. The shape boundary may correspond to spatial dimensions of the virtual object. In some implementations, the shape boundary may be based, at least in part on a mesh, etc. of the virtual object. In some implementations, a polygon having a shape corresponding to the spatial dimensions of the virtual object, and having a shape boundary based on the shape may be identified. The polygon may comprise a shape having at least two sides of equal length, including but not limited to shapes equilateral shapes, shapes where opposing sides of equal length (rectangles, etc.), etc. In some implementations, the polygon comprises a shape where at least two sides are of different length. In some implementations, a boundary region of the virtual object may be identified using properties of the virtual object, such as a mesh or other boundary contours of the virtual object, a virtual position of the virtual object in the virtual environment, one or more axes associated with the virtual object in the virtual environment, etc.

At an operation 1306, one or more primitive virtual elements to form the shape boundary in the virtual environment may be gathered. In various implementations, the one or more primitive virtual elements may have a spatial dimension and an interaction volume, where the interaction volume defines an area of interactivity with the one or more primitive virtual elements. The primitive virtual elements may comprise a line primitive in various implementations. Other primitive shapes are possible without departing from the scope and substance of the inventive concepts described herein.

At an operation 1308, a virtual frame may be formed for the virtual object. The virtual frame may be based on the shape boundary and being formed from the one or more primitive virtual elements. The virtual frame may have a frame boundary corresponding to the shape boundary. The virtual frame may have an interaction volume based on the interaction volumes of the one or more primitive virtual elements. The interaction volume of the virtual frame may allow user interaction with the virtual frame in the virtual environment.

At an operation 1310, the virtual frame may be placed around the virtual object in the virtual environment. The placement of the virtual frame around the virtual object may allow the virtual frame and the virtual object to move as a rigid body in the virtual environment. More specifically, placing the virtual frame around the virtual object may allow the virtual frame and the virtual object to be translated, rotated, etc. within the virtual environment in response to user instructions to do so.

At an operation 1312, the one or more primitive elements may be locked to the virtual frame. This locking may allow the virtual frame and the virtual object to move as a virtual rigid body in the virtual environment.

At an operation 1314, an instruction to move the virtual rigid body in an unpermitted manner may be received. In some implementations, the instruction may comprise a request to, e.g., rotate the virtual rigid body around an axis that runs through a plane containing the virtual frame (e.g., an x axis or a y axis). In some implementations, the instruction may comprise a request to move the virtual rigid body less than a specified distance (e.g., if the virtual rigid body is at a first virtual point, the instruction may comprise a request to move the virtual rigid body less than a specified distance (e.g., one virtual inch) away from the first virtual point). At an operation 1316, the virtual rigid body may be blocked from moving in the unpermitted manner in response to the instruction.

Figure 13B:
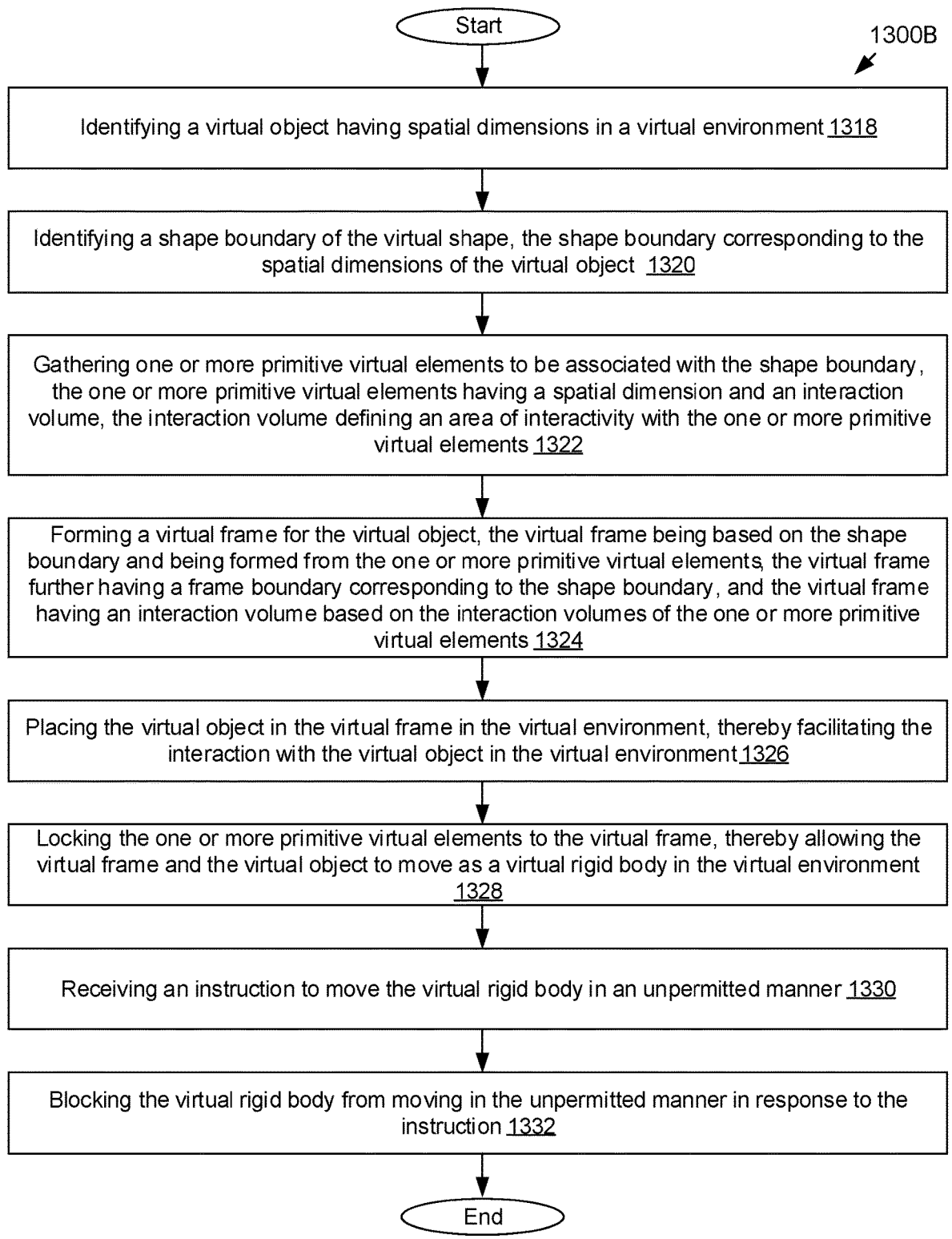
FIG. 13B is a flowchart showing an example of a process for interacting with a virtual rigid body comprising a virtual frame and a virtual object, in accordance with one or more implementations.

FIG. 13B is a flowchart showing an example of a process 1300B for interacting with a virtual rigid body comprising a virtual frame and a virtual object, in accordance with one or more implementations. The process 1300B may be implemented by one or more of the modules of the virtual frame creation component 130 and/or other modules discussed herein.

At an operation 1318, a virtual object having spatial dimensions in a virtual environment may be identified. In VR implementations, the virtual object may comprise any item in a virtual environment. In AR implementations, the virtual object may comprise any item in a virtual environment, including items that correspond to virtual representations of physical objects in the physical world.

At an operation 1320, a shape boundary of the virtual shape may be identified. The shape boundary may correspond to spatial dimensions of the virtual object. In some implementations, the shape boundary may be based, at least in part on a mesh, etc. of the virtual object. In some implementations, a polygon having a shape corresponding to the spatial dimensions of the virtual object, and having a shape boundary based on the shape may be identified. The polygon may comprise a shape having at least two sides of equal length, including but not limited to shapes equilateral shapes, shapes where opposing sides of equal length (rectangles, etc.), etc. In some implementations, the polygon comprises a shape where at least two sides are of different length. In some implementations, a boundary region of the virtual object may be identified using properties of the virtual object, such as a mesh or other boundary contours of the virtual object, a virtual position of the virtual object in the virtual environment, one or more axes associated with the virtual object in the virtual environment, etc.

At an operation 1322, one or more primitive virtual elements to form the shape boundary in the virtual environment may be gathered. In various implementations, the one or more primitive virtual elements may have a spatial dimension and an interaction volume, where the interaction volume defines an area of interactivity with the one or more primitive virtual elements. The primitive virtual elements may comprise a line primitive in various implementations. Other primitive shapes are possible without departing from the scope and substance of the inventive concepts described herein.

At an operation 1324, a virtual frame may be formed for the virtual object. The virtual frame may be based on the shape boundary and being formed from the one or more primitive virtual elements. The virtual frame may have a frame boundary corresponding to the shape boundary. The virtual frame may have an interaction volume based on the interaction volumes of the one or more primitive virtual elements. The interaction volume of the virtual frame may allow user interaction with the virtual frame in the virtual environment.

At an operation 1326, the virtual object may be placed in the virtual frame in the virtual frame. The placement of the virtual object in the virtual frame may allow the virtual frame and the virtual object to move as a rigid body in the virtual environment. More specifically, placing the virtual object in the virtual frame may allow the virtual frame and the virtual object to be translated, rotated, etc. within the virtual environment in accordance with any parameters associated with the virtual frame and in response to user instructions to do so.

At an operation 1328, the one or more primitive elements may be locked to the virtual frame. This locking may allow the virtual frame and the virtual object to move as a virtual rigid body in the virtual environment.

At an operation 1330, an instruction to move the virtual rigid body in an unpermitted manner may be received. In some implementations, the instruction may comprise a request to, e.g., rotate the virtual rigid body around an axis that runs through a plane containing the virtual frame (e.g., an x axis or a y axis). In some implementations, the instruction may comprise a request to move the virtual rigid body less than a specified distance (e.g., if the virtual rigid body is at a first virtual point, the instruction may comprise a request to move the virtual rigid body less than a specified distance (e.g., one virtual inch) away from the first virtual point). At an operation 1332, the virtual rigid body may be blocked from moving in the unpermitted manner in response to the instruction.

Figure 14:
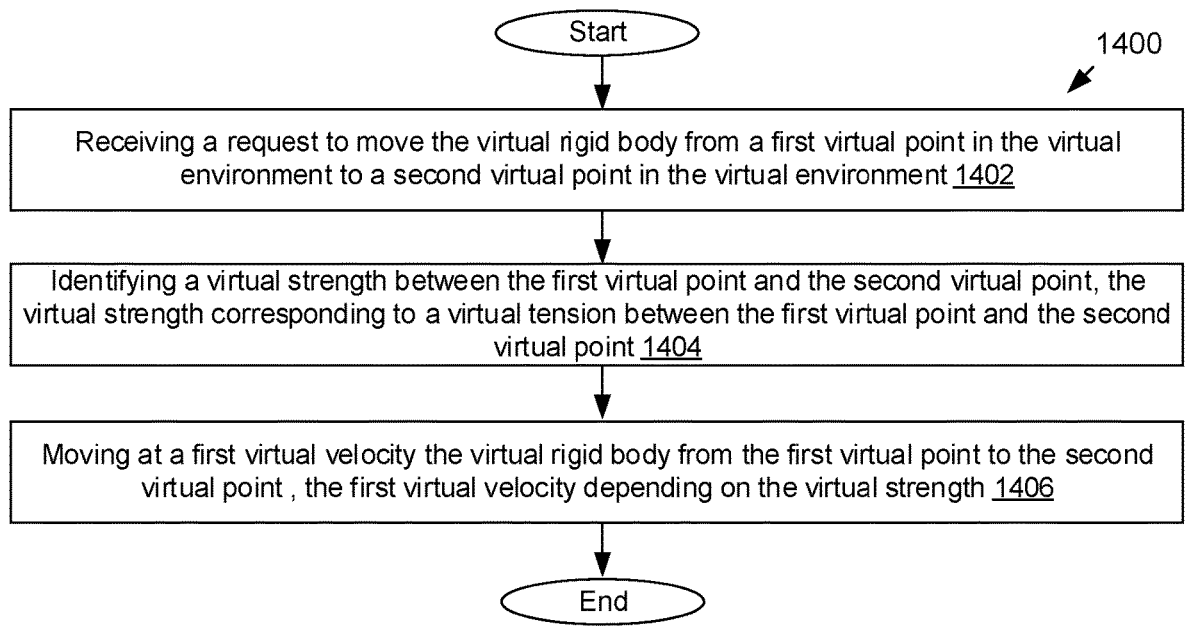
FIG. 14 is a flowchart showing an example of a process for interacting with a virtual rigid body comprising a virtual frame and a virtual object, in accordance with one or more implementations.

Process 1400 for Interacting with a Virtual Rigid Body Comprising a Virtual Frame and a Virtual Object FIG. 14 is a flowchart showing an example of a process 1400 for interacting with a virtual rigid body comprising a virtual frame and a virtual object, in accordance with one or more implementations. The process 1400 may be implemented by one or more of the modules of the virtual frame creation component 130 and/or other modules discussed herein.

At an operation 1402, a request to move the virtual object from a first virtual point in the virtual environment to a second virtual point in the virtual environment may be received. At an operation 1404, a virtual strength between the first virtual point and the second virtual point may be identified. The virtual strength may correspond to a virtual tension between the first virtual point and the second virtual point. At an operation 1406, the virtual rigid body may be moved at a first virtual velocity that depends on the virtual strength from the first virtual point to the second virtual point.

Example Hardware Implementations

Example Processing System 1500

Figure 15:
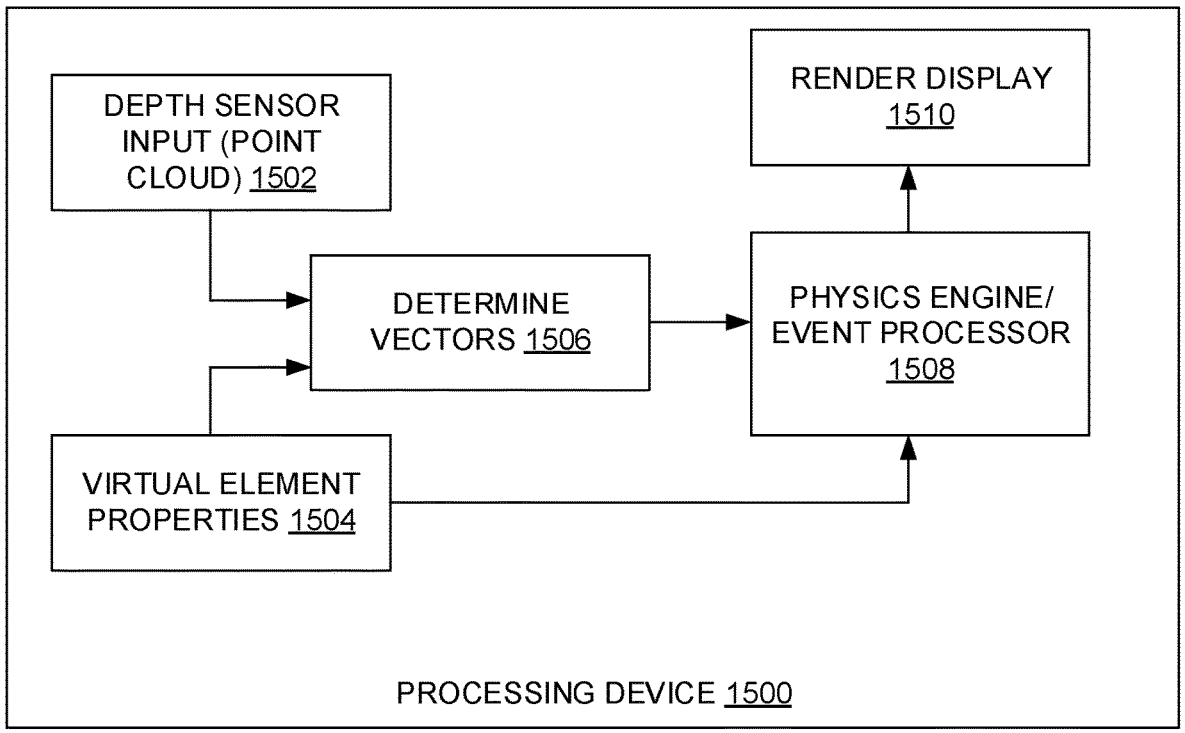
FIG. 15 shows a block diagram illustrating example components of a processing system, in accordance with some implementations.

FIG. 15 shows a block diagram illustrating example components of a processing system 1500, in accordance with some implementations. The processing system 1500 may include a depth sensor input system 1502, a virtual element properties system 1504, a vector determination system 1506, a physics engine/event processor 1508, and a display rendering system 1510. One or more of the elements of the processing system 1500 may correspond to one or more of the elements of the virtual environment management system 100, shown in FIG. 1.

In some implementations, inputs from a depth sensor input system 1502 and parameters for a virtual element provided to the virtual element properties system 1504 may be input to the vector determination system 1506. In various implementations the vector determination system 1506 may implement one or more of the vector determinations derived by the process 900 shown in FIG. 9, the process 1000 shown in FIG. 10, the process 1100 shown in FIG. 11, the processes 1200A and 1200B shown in FIGS. 12A and 12B, the processes 1300A and 1300B shown in FIGS. 13A and 13B, and/or the process 1400 shown in FIG. 14. The vectors determined by the vector determination system 1506 along with the parameters are inputs to the physics engine/event processor 1508 (which may comprise physics engine(s), event engine(s), gesture engine(s), and/or any other defined logic to determine events and render of content associated with a virtual element within a 3D virtual environment based on the input from the sensors). The data may be output to another program or application to cause rendering of the content associated with an event for viewing by a user. For example, the output may be provided to the display rendering system 1510 for rendering in a display or other visual output device. In this manner, input corresponding to real world objects may be used influence and manipulate virtual elements using a charge and interaction volume.

Example Head Mounted Display System 1600

FIGS. 16A, 16B, 16C, 16D, and 16E illustrate examples of head mounted display (HMD) components of a system for displaying a virtual environment, in accordance with one or more implementations.

Figure 16A:
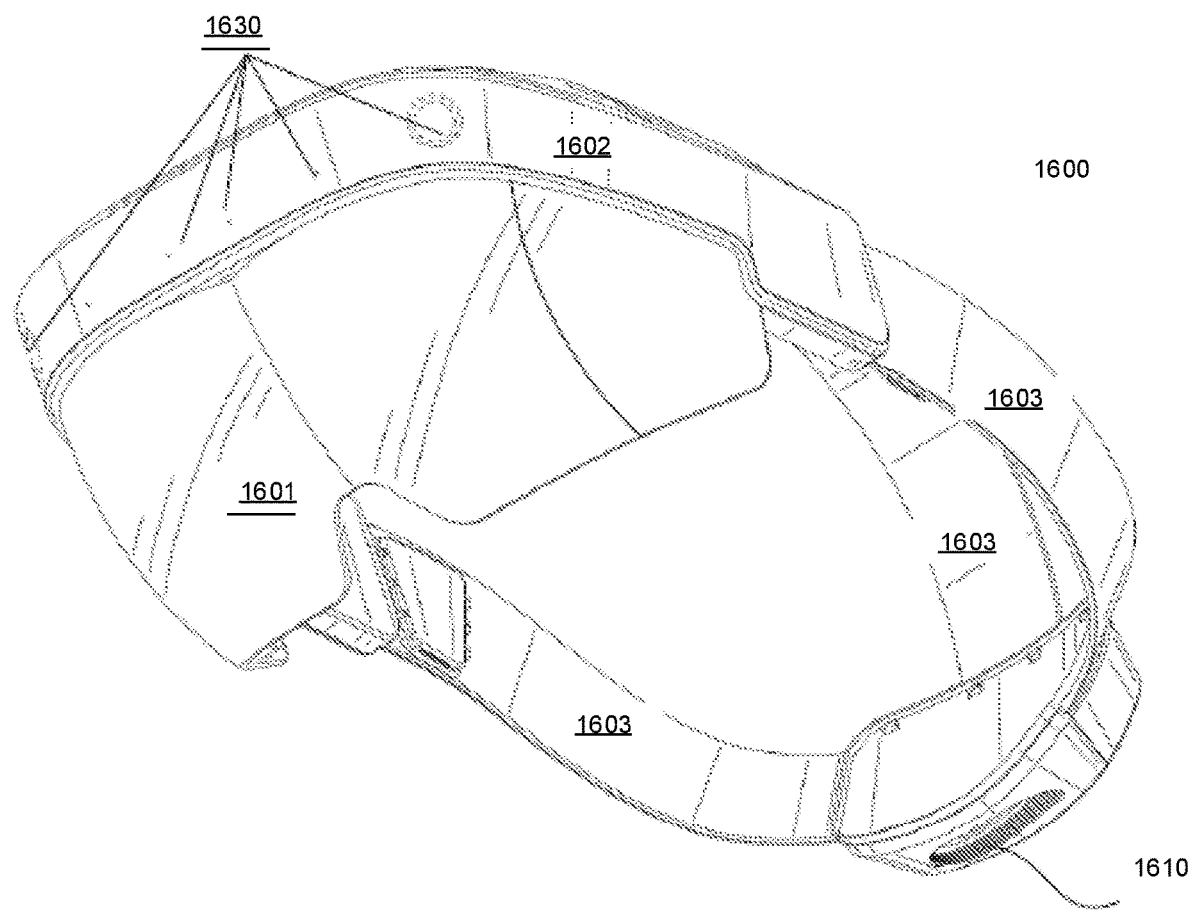
FIGS. 16A, 16B, 16C, 16D, and 16E illustrate examples of head mounted display components of a system for displaying a virtual environment, in accordance with one or more implementations.
Figure 16B:
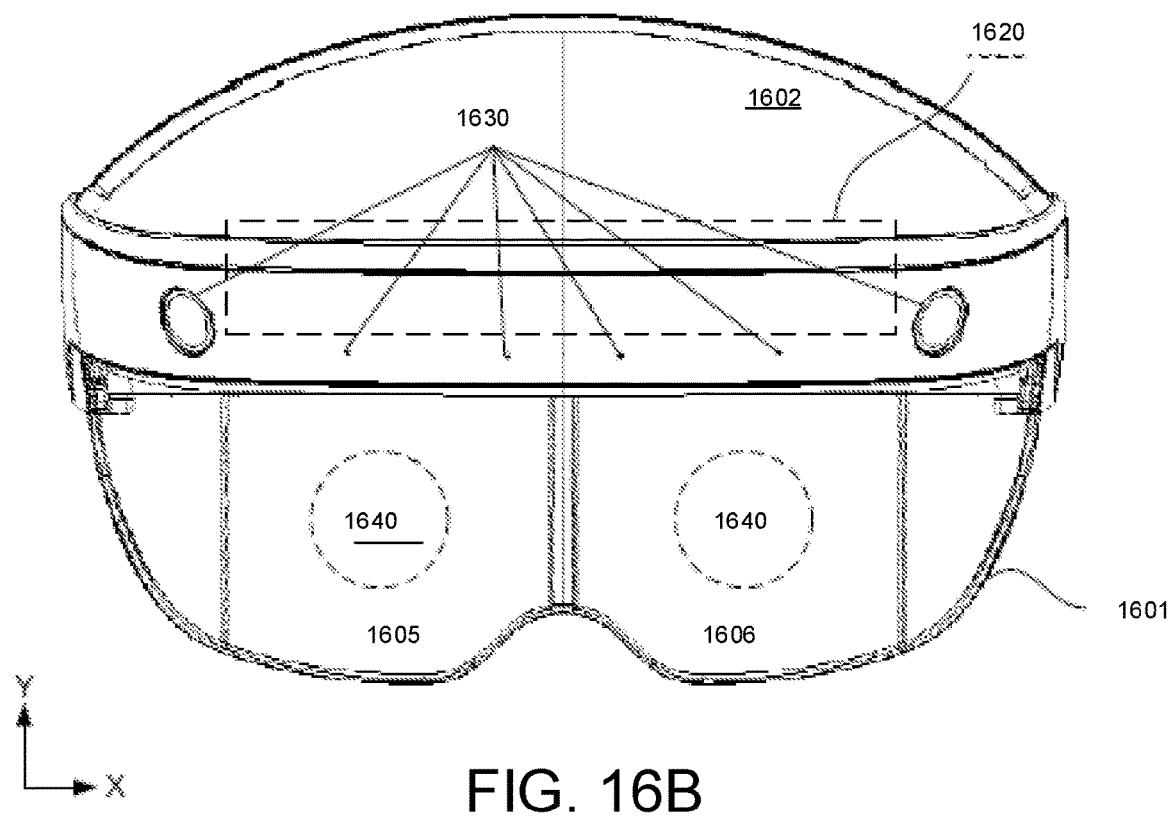
Figure 16C:
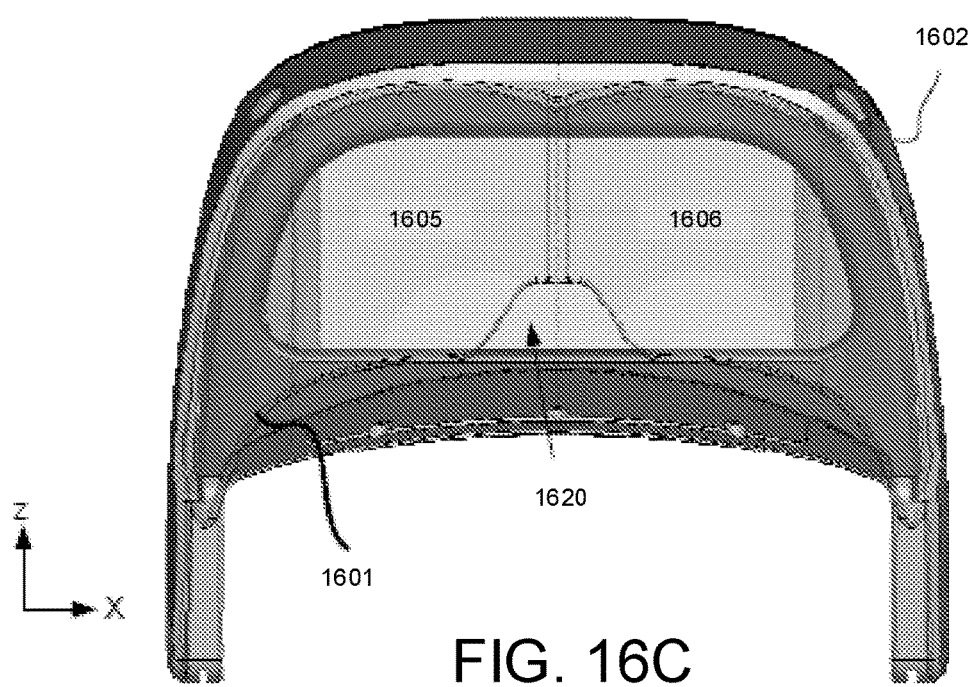

FIGS. 16A, 16B, 16C show a perspective view, front view, and bottom view, respectively, of one example of an HMD 1600. As shown the HMD includes a visor 1601 attached to a housing 1602, straps 1603, and a mechanical adjuster 1610 used to adjust the position and fit of the HMD to provide comfort and optimal viewing by a user of the HMD 1600. The visor 1601 may include one or more optical elements, such as an image combiner, that includes a shape and one or more reflective coatings that reflect an image from an image source 1620 to the eyes of the user. In one example, the coating is partially reflective allowing light to pass through the visor to the viewer and thus create a synthetic image in the field of view of the user overlaid on the user's environment and provide an augmented reality user interface. The visor 1601 can be made from a variety of materials, including, but not limited to, acrylic, polycarbonate, PMMA, plastic, glass, and/or the like and can be thermoformed, single diamond turned, injection molded, and/or the like to position the optical elements relative to an image source and eyes of the user and facilitate attachment to the housing of the HMD.

In one implementation, the visor 1601 may include two optical elements, for example, image regions 1605, 1606 or clear apertures. In this example, the visor 1601 also includes a nasal or bridge region, and two temporal regions. The image regions are aligned with the position 1640 of one eye of a user (e.g., as shown in FIG. 16B) to reflect an image provided from the image source 1620 to the eye of a user of the HMD. A bridge or nasal region is provided between the two image regions to connect the image regions 1605 and the image regions 1606. The image regions 1605 and 1606 mirror one other through the y-z plane that bisects the nasal rejoin. In one implementation, the temporal region extends to an outer edge of the image region wrapping around the eyes to the temple housing of the HMD to provide for peripheral vision and offer support of the optical elements such that the image regions 1605 and 1606 do not require support from a nose of a user wearing the HMD.

Figure 16D:
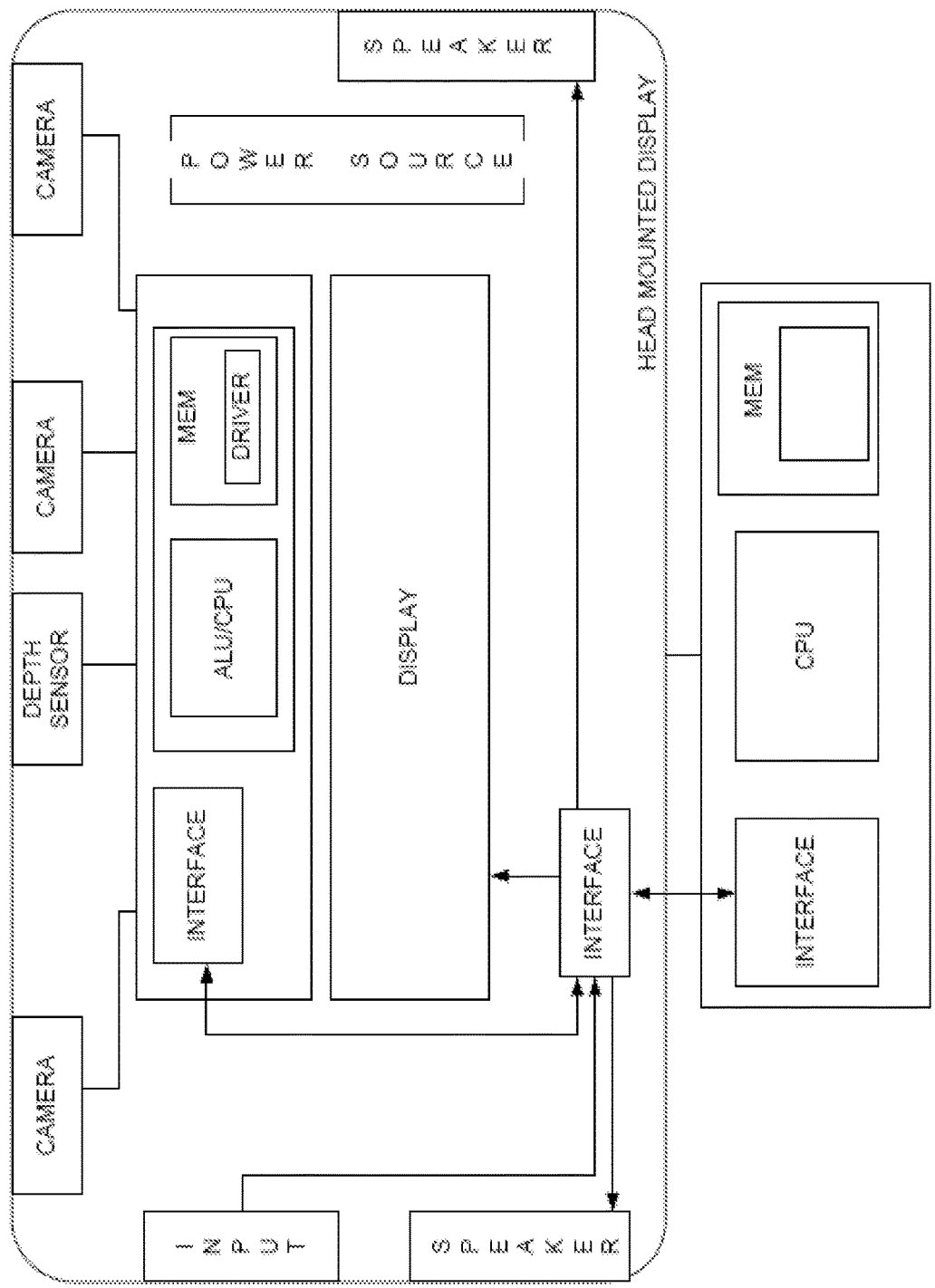

In one implementation, the housing may include a molded section to roughly conform to the forehead of a typical user and/or may be custom-fitted for a specific user or group of users. The housing may include various electrical components of the system, such as sensors 1630, a display, a processor, a power source, interfaces, a memory, and various inputs (e.g., buttons and controls) and outputs (e.g., speakers) and controls in addition to their various related connections and data communication paths. FIG. 16D shows an example implementation in which the processing device is implemented outside of the housing 1602 and connected to components of the HMD using an interface (e.g. a wireless interface, such as Bluetooth or a wired connection, such as a USB wired connector), FIG. 16E shows an implementation in which the processing device is implemented inside of the housing 1602.

The housing 1602 positions one or more sensors 1630 that detect the environment around the user. In one example, one or more depth sensors are positioned to detect objects in the user's field of vision. The housing also positions the visor 1601 relative to the image source 1620 and the user's eyes. In one example, the image source 1620 may be implemented using one or more displays. For example, the image source may be a single display. If an optical element of the image regions 1605, 1606 of the visor is provided for eyes of user(s), the display may be partitioned into at least two halves. For example, the halves may display an image intended for a separate eye. In another example, two displays may be provided. In this example, the display is paired with a corresponding optical element or image area, where the pair provides an image to an eye of the user. Examples of displays include a liquid crystal display (LCD), a Light Emitting Diode (LED) display, a flexible organic LED (OLED) display, a Liquid Crystal on Silicon (LCoS or LCOS), and/or a fiber optic projection system. In one example, a single 4.5- to 5.2-inch diagonal Liquid Crystal Display (LCD) may be used. In another example, dual 2.8-3.4-inch diagonal LCDs, one for eyes, may be used.

In some implementations, the display may be part of a mobile phone or other mobile device that is separate from, but placed within and/or affixed to, the HMD and/or HMD housing and is subsequently detachable or removable therefrom. For example, a user-accessible opening may be provided to accept and position a mobile phone or other mobile device with a display to provide an image source for the HMD. In this example, a hatch or a slot is configured to accept the mobile phone or other mobile device and provide access to a guide, a rail, one or more walls, or a shelf to position the display of the mobile device or mobile phone outside the field of view and at the geometries according to the descriptions and examples provided herein. In yet another example, an opening may provide one or more fasteners, such as a clip or deformable member that accept and detachably lock and position the display of the mobile device or mobile phone outside the field of view and at the geometries allowing reflection to the user's eyes.

Figure 16E:
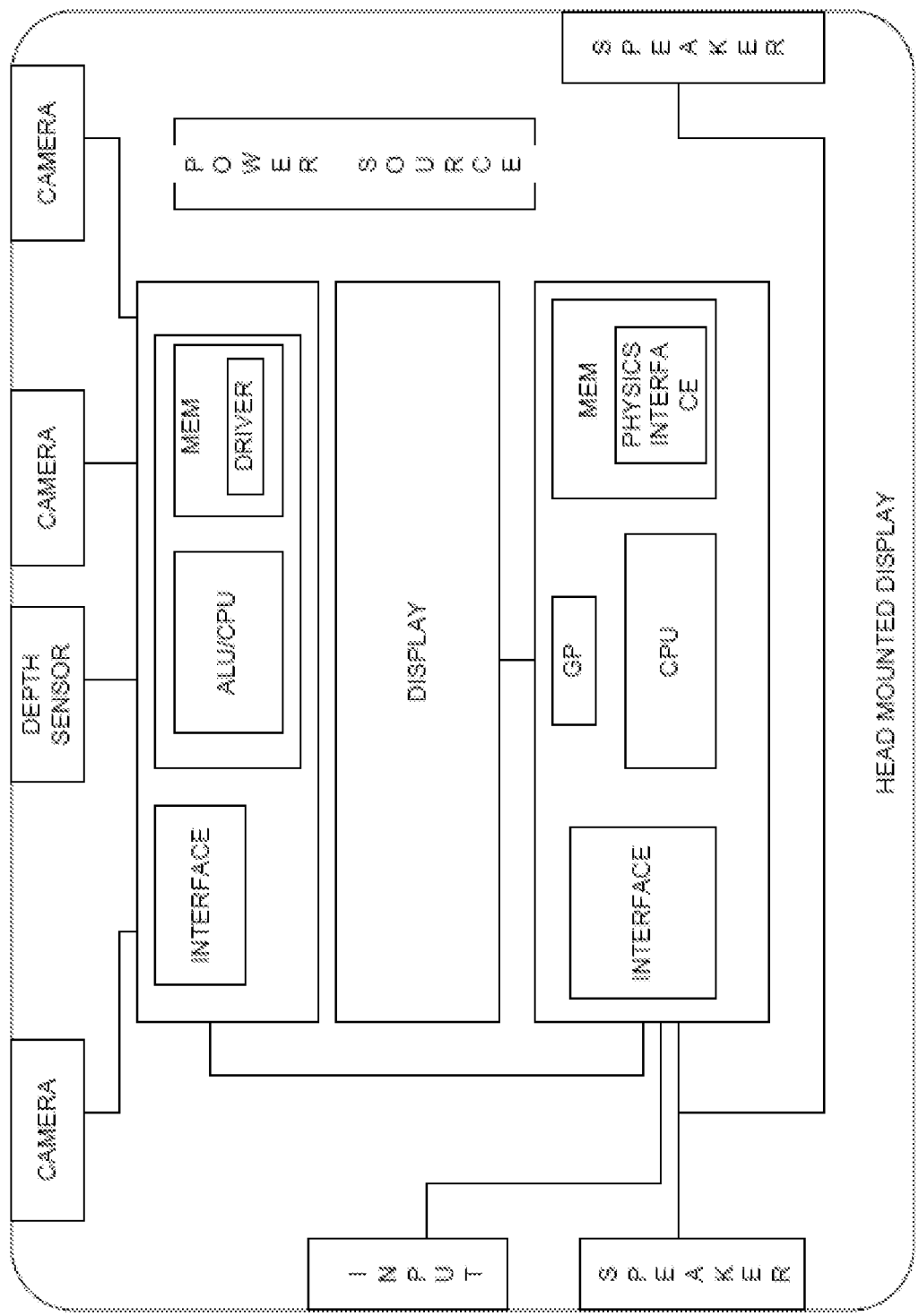

As shown in FIGS. 16D and 16E, a processing device may implement one or more applications or programs. In one example, the processing device includes an associated memory storing one or more applications implemented by the processing device that generate digital image data depicting one or more of graphics, a scene, a graphical user interface, a computer game, a movie, content from the Internet, such as web content accessed from the World Wide Web, among others, that are to be presented to a viewer of the wearable HMD. Examples of applications includes media players, mobile applications, browsers, video games, and graphic user interfaces, to name but a few. In addition, virtual elements corresponding to output of the various applications may are made interactive through use of a 3D environment application for example implemented the processes 900, 1000, 1100, 1200A, 1200B, 1300A, 1300B, and 1400 described herein.

One example of a head mounted display system and components thereof is described in U.S. patent application Ser. No. 14/945,372 titled "Wide Field of View Head Mounted Display Apparatuses, Methods and Systems" filed Nov. 18, 2015, which is herein incorporated by reference in its entirety.

As described above, the techniques described herein for a wearable AR system can be implemented using digital electronic circuitry, or in computer hardware, firmware, software, or in combinations of them in conjunction with various combiner imager optics. The techniques can be implemented as a computer program product, i.e., a computer program tangibly embodied in a non-transitory information carrier, for example, in a machine-readable storage device, in machine readable storage medium, in a computer-readable storage device or, in computer-readable storage medium for execution by, or to control the operation of, data processing apparatus or processing device, for example, a programmable processor, a computer, or multiple computers. A computer program can be written in any form of programming language, including compiled or interpreted languages, and it can be deployed in any form, including as a stand-alone program or as a module, component, subroutine, or other unit suitable for use in the specific computing environment. A computer program can be deployed to be executed by one component or multiple components of the vision system.

The exemplary processes and others can be performed by one or more programmable processing devices or processors executing one or more computer programs to perform the functions of the techniques described above by operating on input digital data and generating a corresponding output. Method steps and techniques also can be implemented as, special purpose logic circuitry, e.g., an FPGA (field programmable gate array) or an ASIC (application-specific integrated circuit).

Processing devices or processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. The processing devices described herein may include one or more processors and/or cores. Generally, a processing device will also include, or be operatively coupled to receive data from or transfer data to, or both, one or more mass storage devices for storing data, such as, magnetic, magneto-optical disks, or optical disks. Non-transitory information carriers suitable for embodying computer program instructions and data include all forms of non-volatile memory, including by way of example semiconductor memory devices, such as, EPROM, EEPROM, and flash memory or solid state memory devices; magnetic disks, such as internal hard disks or removable disks; magneto-optical disks; and CD-ROM and DVD-ROM disks. The processor and the memory can be supplemented by, or incorporated in special purpose logic circuitry.

The HMD may include various other components including various optical devices and frames or other structure for positioning or mounting the display system on a user allowing a user to wear the vision system while providing a comfortable viewing experience for a user. The HMD may include one or more additional components, such as, for example, one or more power devices or connections to power devices to power various system components, one or more controllers/drivers for operating system components, one or more output devices (such as a speaker), one or more sensors for providing the system with information used to provide an augmented reality to the user of the system, one or more interfaces from communication with external output devices, one or more interfaces for communication with an external memory devices or processors, and one or more communications interfaces configured to send and receive data over various communications paths. In addition, one or more internal communication links or busses may be provided in order to connect the various components and allow reception, transmission, manipulation and storage of data and programs.

Although the disclosed technology has been described in detail for the purpose of illustration based on what is currently considered to be the most practical and preferred implementations, it is to be understood that such detail is solely for that purpose and that the disclosure is not limited to any particular implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A method to facilitate interaction with a virtual object in a virtual environment, the method being implemented in a computer system comprising one or more physical processors coupled to a memory and configured by machine-readable instructions, the method comprising:
   identifying the virtual object in the virtual environment, the virtual object having spatial dimensions in the virtual environment;
   identifying a shape boundary of the virtual object, the shape boundary corresponding to the spatial dimensions of the virtual object;
   gathering one or more primitive virtual elements to be associated with the shape boundary, the one or more primitive virtual elements each having a spatial dimension and an interaction volume, each interaction volume defining an area of interactivity with one of the one or more primitive virtual elements;
   forming a virtual frame for the virtual object, the virtual frame being based on the shape boundary and being formed from the one or more primitive virtual elements, the virtual frame further having a frame boundary corresponding to the shape boundary, and the virtual frame having an interaction volume based on the interaction volumes of each of the one or more primitive virtual elements;
   placing the virtual frame around the virtual object in the virtual environment;
   locking the one or more primitive virtual elements to the virtual frame, thereby causing the virtual frame and the virtual object to be modeled as a virtual rigid body that can be moved by a user in the virtual environment; and
   presenting images of the virtual frame and the virtual object in the virtual environment, wherein the interaction volume of the virtual frame facilitates interaction between the user and the virtual object in the virtual environment.

2. The method of claim 1, wherein the shape boundary corresponds to a rectangle.

3. The method of claim 1, further comprising:
   receiving a request to manipulate the virtual frame in the virtual environment, wherein the request is associated with a physical gesture performed by the user in the real-world environment; and
   modifying, in response to the request, the virtual frame and the virtual object as the virtual rigid body based on the physical gesture.

4. The method of claim 3, wherein
   the request comprises a request to move the virtual frame from a first virtual point in the virtual environment to a second virtual point in the virtual environment; and
   the modifying step causes the virtual frame and the virtual object to move from the first virtual point to the second point as the virtual rigid body.

5. The method of claim 3, wherein:
   the request comprises a request to rotate the virtual object along an axis orthogonal to a plane containing the virtual frame; and
   the modifying step prevents the virtual frame and the virtual object from rotating along the axis.

6. The method of claim 3, wherein:
   the request comprises a request to move the virtual object in the virtual environment; and
   the modifying step causes the virtual frame and the virtual object to move at a first virtual velocity from a first virtual point in the virtual environment to a second virtual point in the virtual environment.

7. The method of claim 6, wherein:
   moving the virtual frame and the virtual object from a first virtual point in the virtual environment to a second virtual point in the virtual environment comprises identifying a virtual tension between the first virtual point and the second virtual point; and the first virtual velocity is based on the virtual tension.

8. The method of claim 7, wherein the virtual frame is configured to resist movement when at the first virtual point until the interaction applies a specified virtual force to the interaction element, the specified virtual force exceeding a predetermined force threshold for the virtual frame.

9. The method of claim 1, wherein identifying the shape boundary of the virtual object comprises identifying a polygon having a shape corresponding to the spatial dimensions of the virtual object.

10. The method of claim 9, wherein gathering the one or more primitive virtual elements to be associated with the shape boundary comprises associating the one or more primitive virtual elements with the shape of the polygon in the virtual environment, the one or more primitive virtual elements having a spatial dimension and an interaction volume, the interaction volume defining an area of interactivity with the one or more primitive virtual elements.

11. The method of claim 1, wherein identifying the shape boundary of the virtual object comprises identifying a bounding region of the virtual shape using a characteristic of the virtual object.

12. The method of claim 11, wherein the characteristic of the virtual object is a bounding box.

13. The method of claim 11, wherein the characteristic of the virtual object is a virtual mesh.

14. A system for facilitating interaction with a virtual object in a virtual environment, the system comprising:
   memory;
   one or more physical computer processors coupled to the memory, the one or more physical computer processors configured by computer readable instructions stored in the memory to perform a computer-implemented method, the computer-implemented method comprising:
      identifying the virtual object in the virtual environment, the virtual object having spatial dimensions in the virtual environment;
      identifying a shape boundary of the virtual shape, the shape boundary corresponding to the spatial dimensions of the virtual object;
      gathering one or more primitive virtual elements to be associated with the shape boundary, the one or more primitive virtual elements each having a spatial dimension and an interaction volume, each interaction volume defining an area of interactivity with one of the one or more primitive virtual elements;
      forming a virtual frame for the virtual object, the virtual frame being based on the shape boundary and being formed from the one or more primitive virtual elements, the virtual frame further having a frame boundary corresponding to the shape boundary, and the virtual frame having an interaction volume based on the interaction volumes of each of the one or more primitive virtual elements;
      placing the virtual frame around the virtual object in the virtual environment;
      locking the one or more primitive virtual elements to the virtual frame, thereby causing the virtual frame and the virtual object to be modeled as a virtual rigid body that can be moved by a user in the virtual environment; and
      presenting images of the virtual frame and the virtual object in the virtual environment, wherein the interaction volume of the virtual frame facilitates interaction between the user and the virtual object in the virtual environment.

15. The system of claim 14, wherein the shape boundary corresponds to a polygon.

16. The system of claim 14, wherein the one or more physical computer processors are configured by the computer readable instructions stored in the memory to perform:
   receiving a request to manipulate the virtual frame in the virtual environment, wherein the request is associated with a physical gesture performed by the user in the real-world environment; and
   modifying, in response to the request, the virtual frame and the virtual object as the virtual rigid body based on the physical gesture.

17. The system of claim 16, wherein:
the request comprises a request to move the virtual frame from a first virtual point in the virtual environment to a second virtual point in the virtual environment; and
the virtual frame and the virtual object are modified to move from the first virtual point to the second point as the virtual rigid body.

18. The system of claim 16, wherein:
The request comprises a request to move the virtual object in the virtual environment; and
the virtual frame and the virtual object are moved at a first virtual velocity from a first virtual point in the virtual environment to a second virtual point in the virtual environment.

19. The system of claim 18, wherein the virtual frame and the virtual object are moved by:
   identifying a virtual strength between the first virtual point and the second virtual point, the virtual strength corresponding to a virtual tension between the first virtual point and the second virtual point; and
   setting the first virtual velocity based on the virtual tension.

20. The system of claim 19, wherein the virtual frame is configured to resist movement when at the first virtual point until a specified virtual force is applied to the interaction element, the specified virtual force exceeding a predetermined force threshold for the virtual frame.

* * * * *